Oct. 19, 1965   L. E. ELPHEE   3,212,130
MACHINE FOR AUTOMATIC BLOW MOLDING OF PLASTIC CONTAINERS
Filed Jan. 9, 1963   19 Sheets-Sheet 1

INVENTOR.
LEON E. ELPHEE
BY
ATTORNEY

Oct. 19, 1965     L. E. ELPHEE     3,212,130
MACHINE FOR AUTOMATIC BLOW MOLDING OF PLASTIC CONTAINERS
Filed Jan. 9, 1963     19 Sheets-Sheet 2
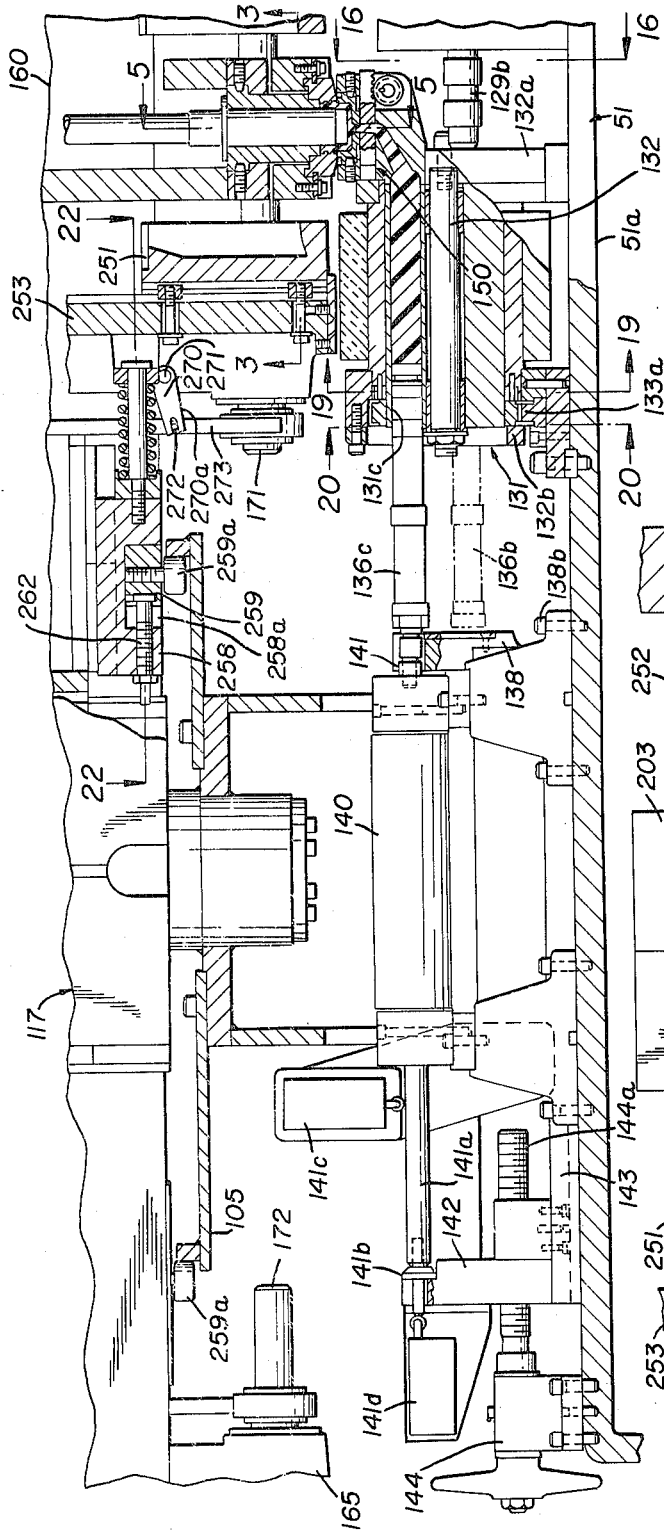
FIG. 2
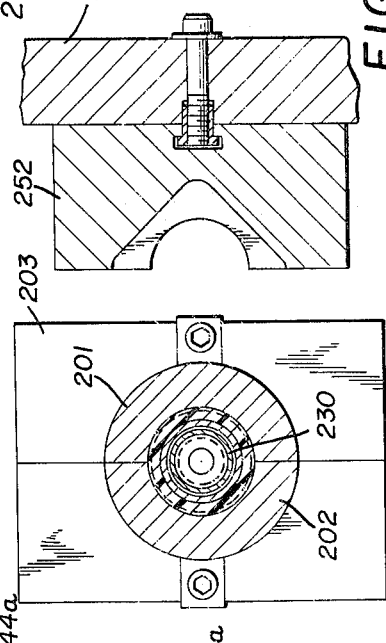
FIG. 3
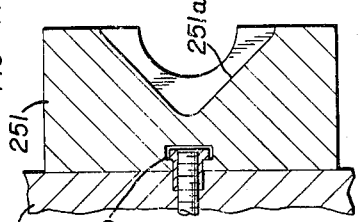
INVENTOR.
LEON E. ELPHEE
BY J. William Freeman
ATTORNEY

INVENTOR.
LEON E. ELPHEE
BY
ATTORNEY

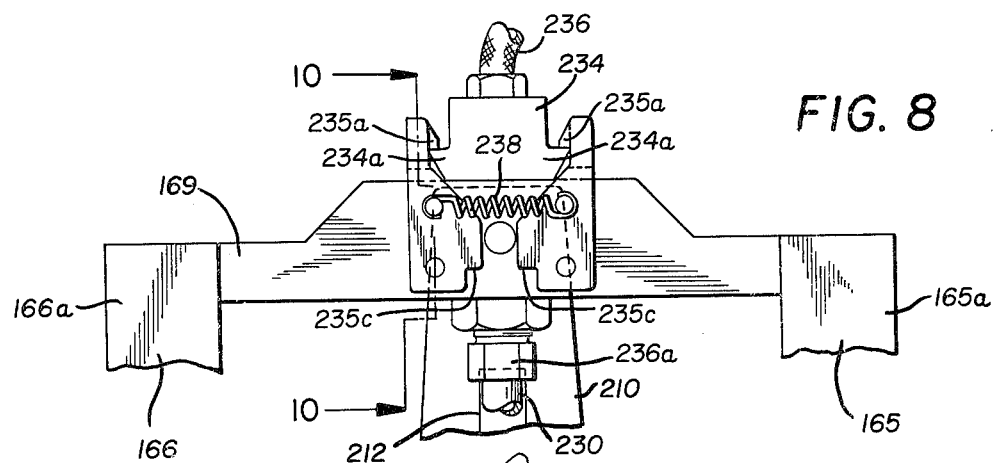
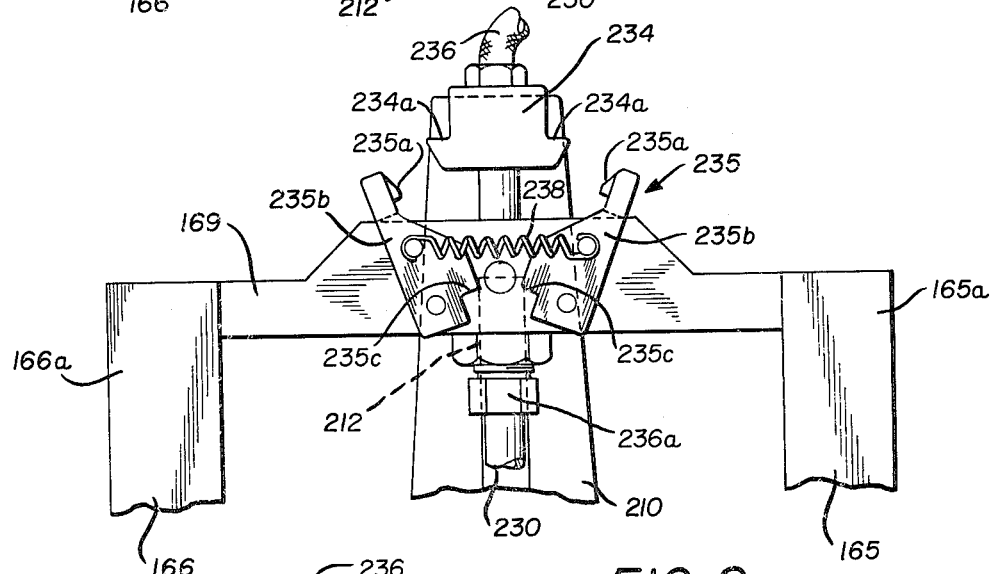
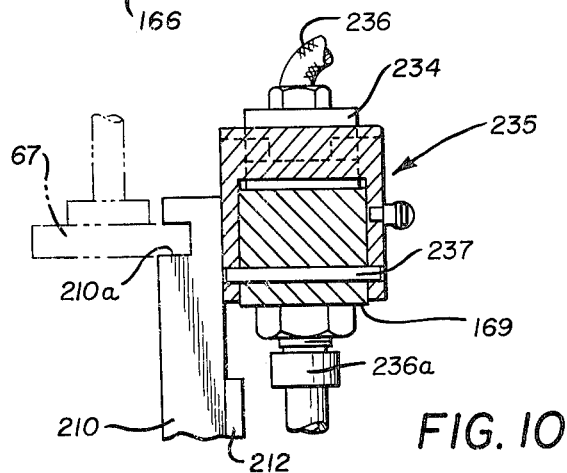

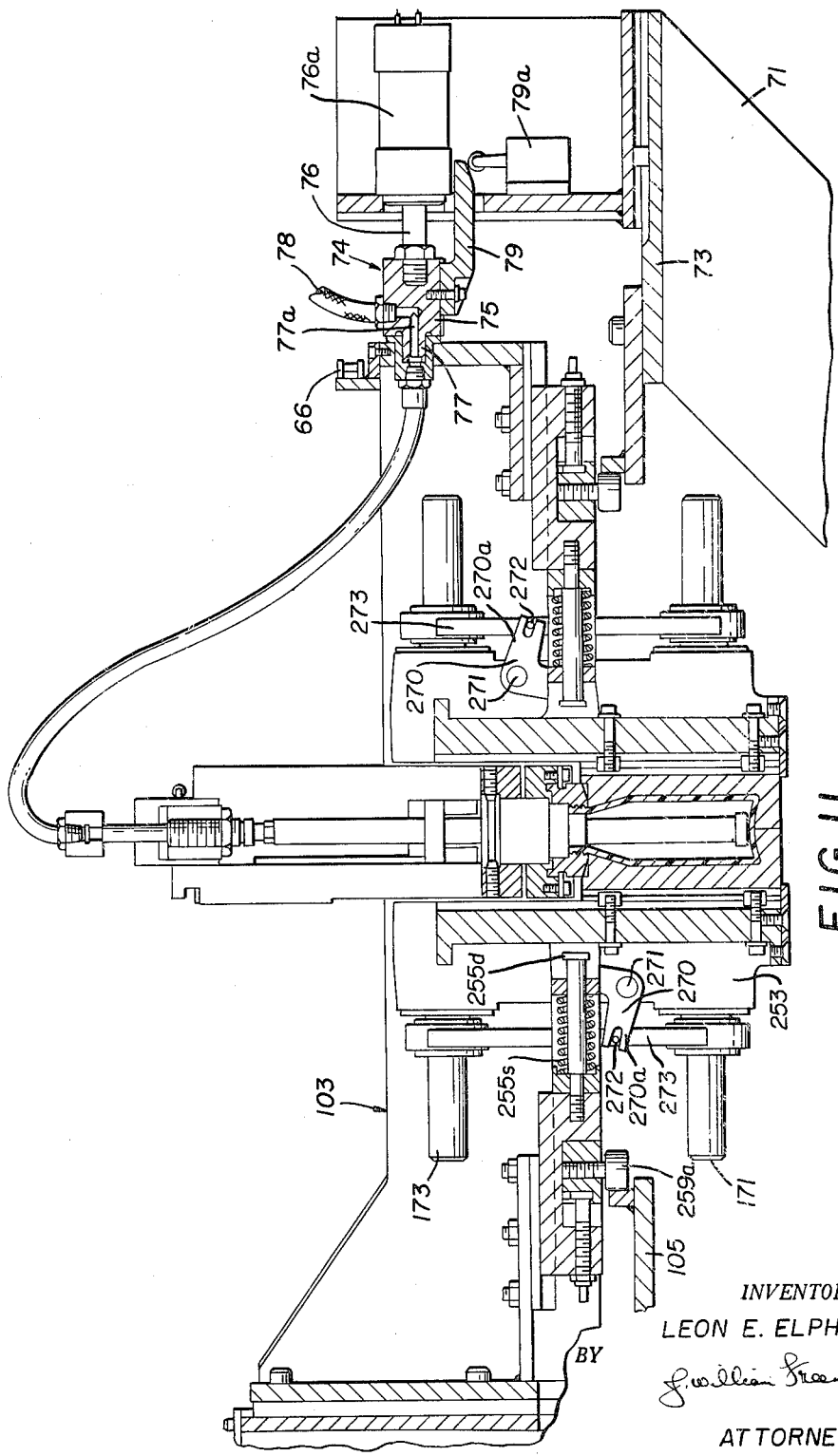

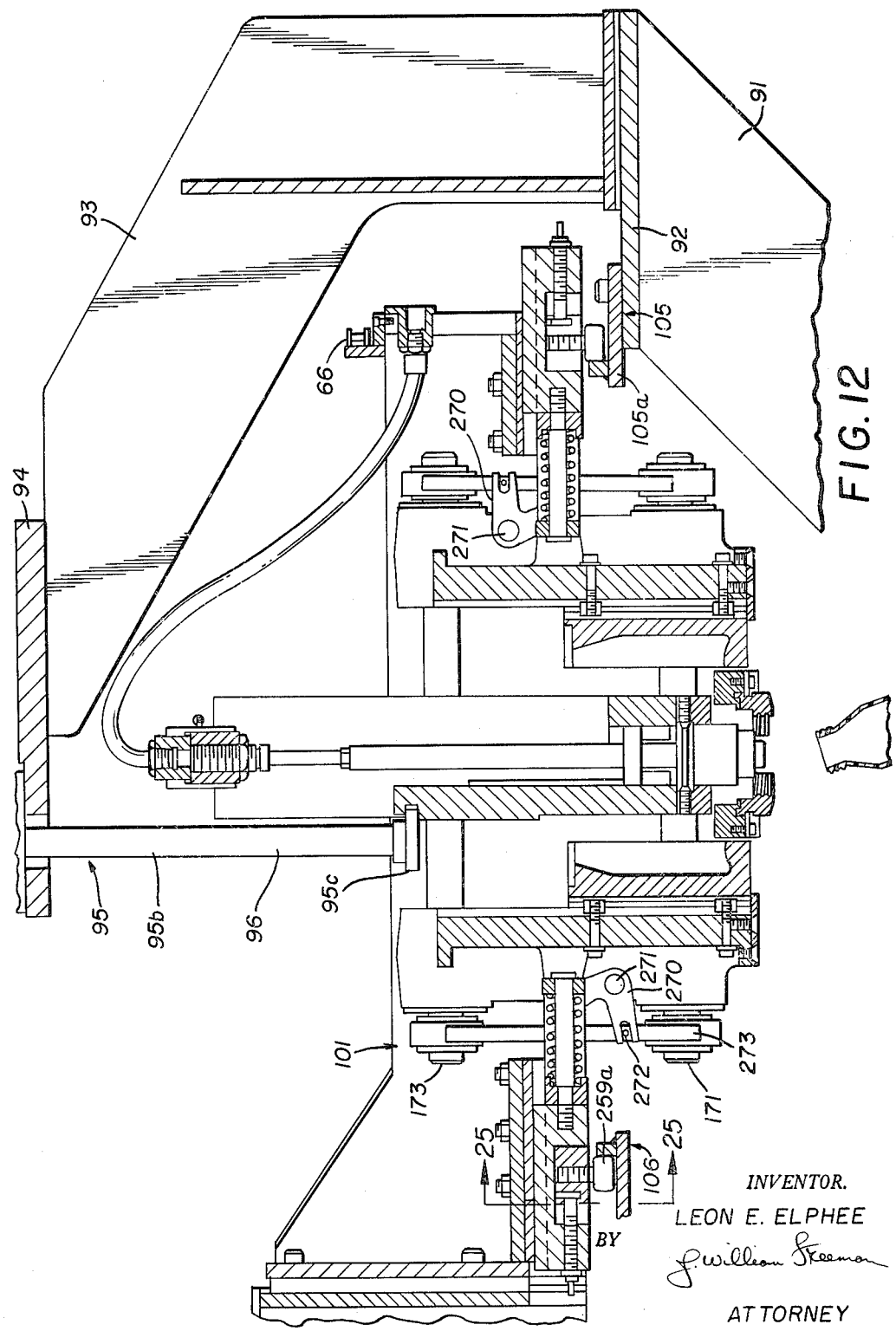

INVENTOR.
LEON E. ELPHEE
BY
*J. William Freeman*
ATTORNEY

INVENTOR.
LEON E. ELPHEE
BY
ATTORNEY

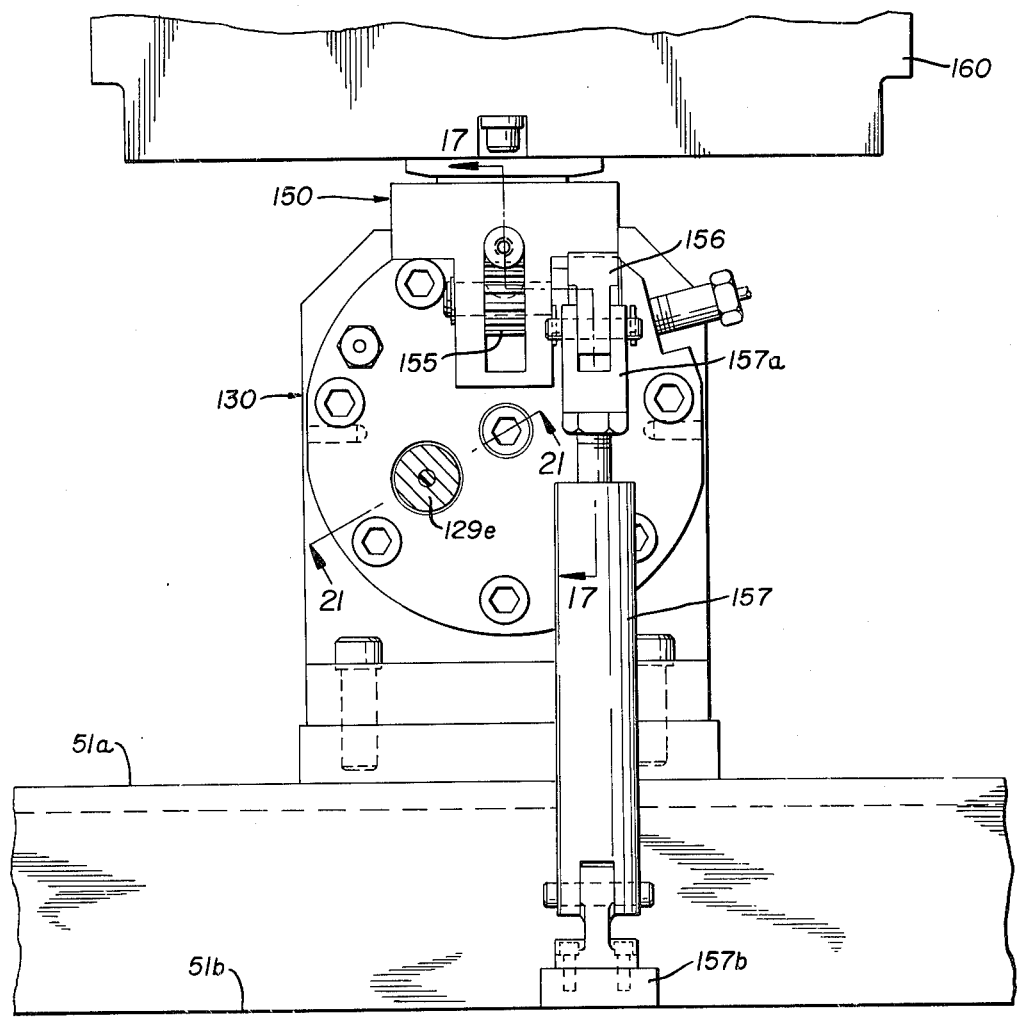
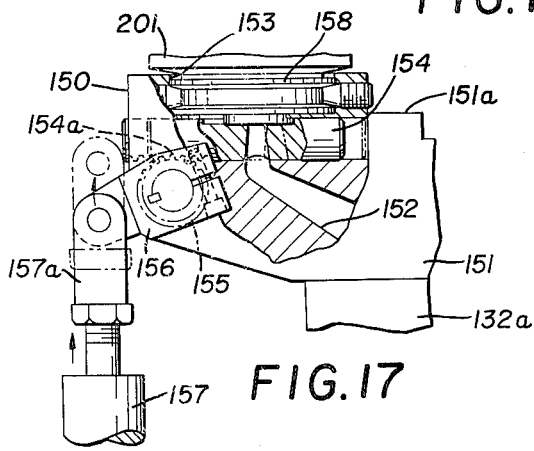
FIG. 16
FIG. 17
INVENTOR.
LEON E. ELPHEE

INVENTOR.
LEON E. ELPHEE
BY
ATTORNEY

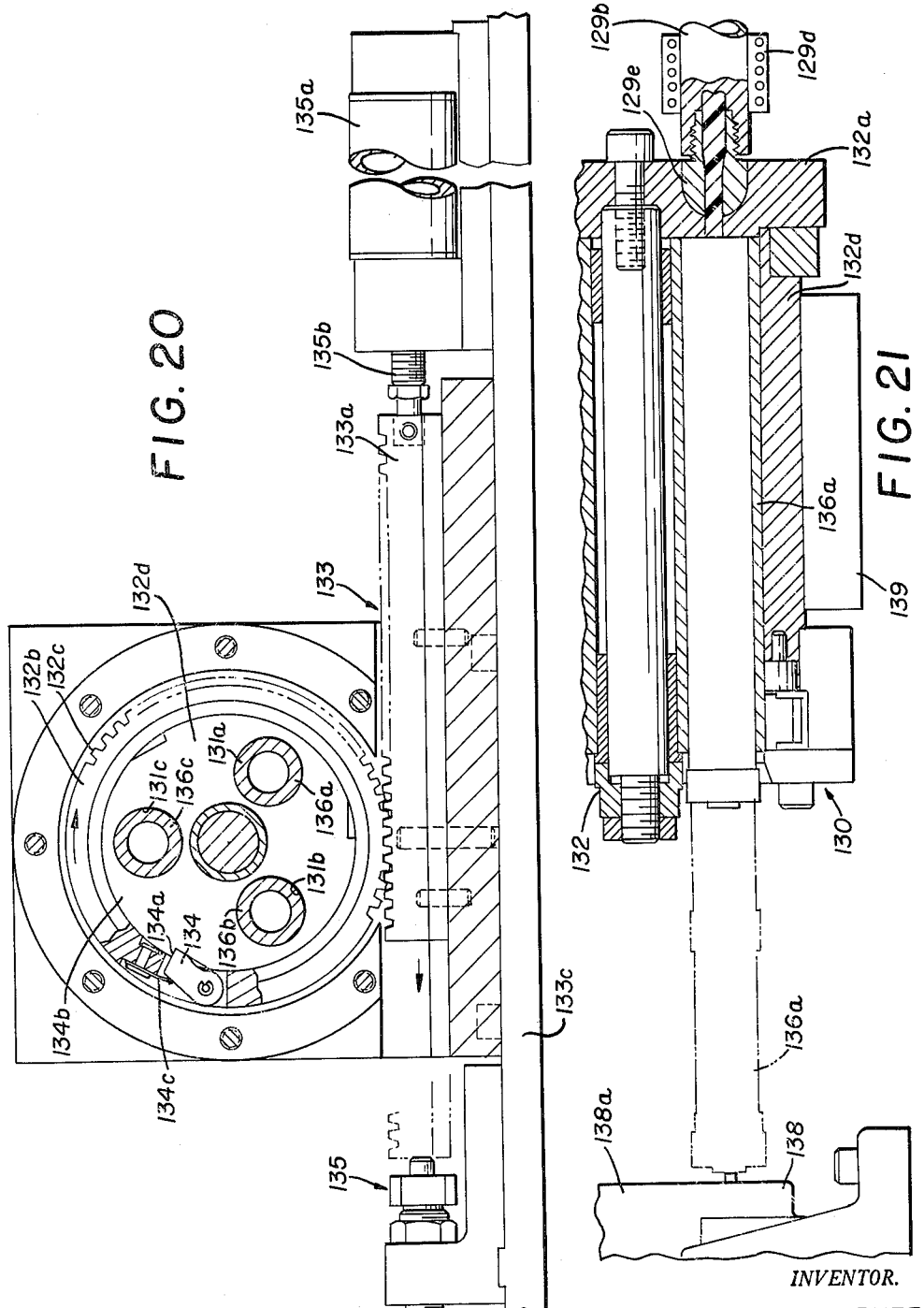

INVENTOR.
LEON E. ELPHEE
BY
*J. William Freeman*
ATTORNEY

Oct. 19, 1965     L. E. ELPHEE     3,212,130
MACHINE FOR AUTOMATIC BLOW MOLDING OF PLASTIC CONTAINERS
Filed Jan. 9, 1963     19 Sheets-Sheet 14

*INVENTOR.*
LEON E. ELPHEE
BY
*ATTORNEY*

INVENTOR.
LEON E. ELPHEE

Oct. 19, 1965    L. E. ELPHEE    3,212,130
MACHINE FOR AUTOMATIC BLOW MOLDING OF PLASTIC CONTAINERS
Filed Jan. 9, 1963    19 Sheets-Sheet 17

INVENTOR.
LEON E. ELPHEE
BY
ATTORNEY

INVENTOR.
LEON E. ELPHEE
BY
ATTORNEY

INVENTOR.
LEON E. ELPHEE
BY
ATTORNEY

United States Patent Office

3,212,130
Patented Oct. 19, 1965

3,212,130
MACHINE FOR AUTOMATIC BLOW MOLDING OF PLASTIC CONTAINERS
Leon E. Elphee, Lakewood, Ohio, assignor to Portage Machine Company, Akron, Ohio, a corporation of Ohio
Filed Jan. 9, 1963, Ser. No. 250,415
11 Claims. (Cl. 18—5)

This invention relates to the art of manufacturing plastic containers, such as bottles wherein a charge of moldable plastic materials is introduced between opposed molding cavities and then blown to final configuration by the use of internally applied air pressure.

Representative of the art to which the subject matter herein is directed is Wilkalis Patent No. 2,936,481 issued May 17, 1960. The Wilkalis patent utilizes the subcombination of a concentrically arranged neck ring, a sleeve and a mandrel to define a cavity within which the neck portion of the bottle may be initially molded, with the above components then being moved in unison from the source where the material enters so as to form a column that is positioned between the separated mold sections. The column is then closed off by closure of the mold whereupon pressure may be applied through the interior of the supporting mandrel to pressure form the column of plastic material to the configuration of the closed mold.

The subject matter of the Wilkalis patent is a refinement of the original technique of first forming the neck of an article by ejection molding of the material, and then forming the body portion of the article by extruding and shaping additional material that is integral with the neck of the article. Such a broad concept was taught originally by Hobskin Patent No. 2,288,454, issued June 30, 1942.

The instant subject matter envisions further improvement of this technique by eliminating the problem of trimming or forming the trailing end so as to provide for continuous operation that does not require a stock removing operation as does the prior art above discussed.

Specifically and while Wilkalis Patent No. 2,936,481 teaches movement of the neck forming components together in unison away from the discharge opening for the purpose of forming the body, the instant applicant has found that improved results can be achieved by retaining the forming mandrel in adjacency with the discharge opening, while initially moving only the neck die and its associated components. Subsequently, when the proper amount of charge has been delivered to result in the proper length of body material having been formed around the mandrel, then and only then will the mandrel and the neck forming die be shifted in unison. Stated otherwise, the lost motion effect achieved between the neck die and the forming mandrel causes a measured charge to be formed in tubular form around the projecting end of said mandrel to thus close off the rough formed container. This rough formed container is then separated from the discharge opening to thus avoid the necessity of a snipping or trimming operation which would require an additional step.

It has been further found that by use of air pressure directed upwardly from the mandrel, the plastic column so produced will be concentric and spaced with respect to the forming rod at all times so that no problem of distortion is present in connection with the improved apparatus.

It has been further discovered that a continuous type of operation can be carried out in connection with the aforementioned improved forming mechanism by utilizing a rotary turret construction wherein four, for example, operating stations are provided for the purpose of coacting with four arms that rotate progressively through each station. Thus, while one bottle is being initially formed on the first arm, for example, the second bottle can have the first blowing operation consummated on the second arm, while still another bottle can have its final blowing operation conducted on the third arm, with the bottles that have been formed and carried by the fourth arm being ejected simultaneously.

Improved mechanisms for effectuating this continuous sequence are accordingly another further object of this invention.

It has further been discovered in connection with production of an improved apparatus to make bottles of the type above described, that greater consistency of temperature with regard to the plastic material can be achieved by the use of an indexible turret that supplies a predetermined charge of material to the discharge opening for each successive bottle that is formed. In this regard, it has been discovered that if material is loaded, stored and then discharged, the consistency thereof will remain more uniform to accordingly effectuate an appreciable increase in the overall quality of the end product.

It has still further been discovered that careful pretreatment of the material prior to delivery to the indexible storage turret can result in elimination of strain, provided that such pretreatment includes treatment of every fibre in uniform amounts.

Accordingly, production of improved means for supplying the material of a proper consistency is a still further object of this invention.

Production of improved blow molding equipment obtaining the above objectives accordingly becomes the principal object of this invention with other objects thereof becoming more apparent upon a reading of the following brief specification, considered and interpreted in the light of the accompanying drawings.

Of the drawings:

FIGURE 2 is a vertical section taken on the lines 2—2 of FIGURE 1 and showing the plastic material beginning to flow into the forming die at the first station of operation.

FIGURE 3 is a horizontal section taken on the lines 3—3 of FIGURE 2.

Figure 5:
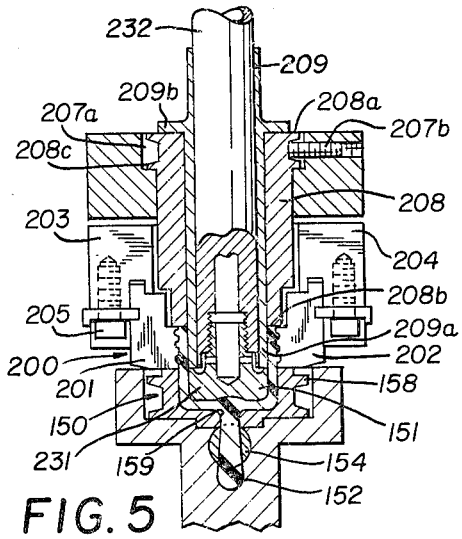
Figure 6:
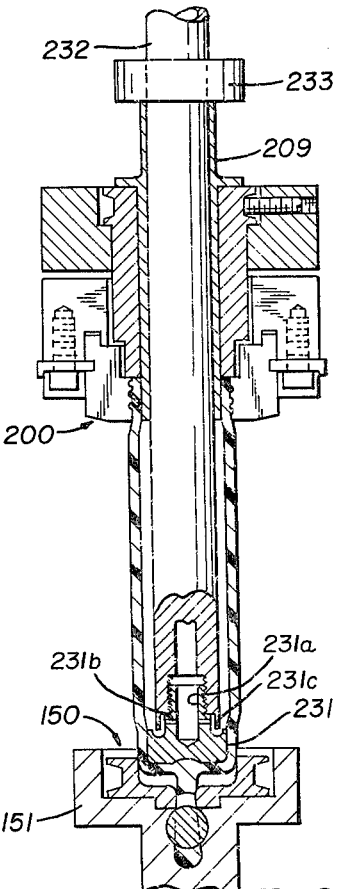
Figure 7:
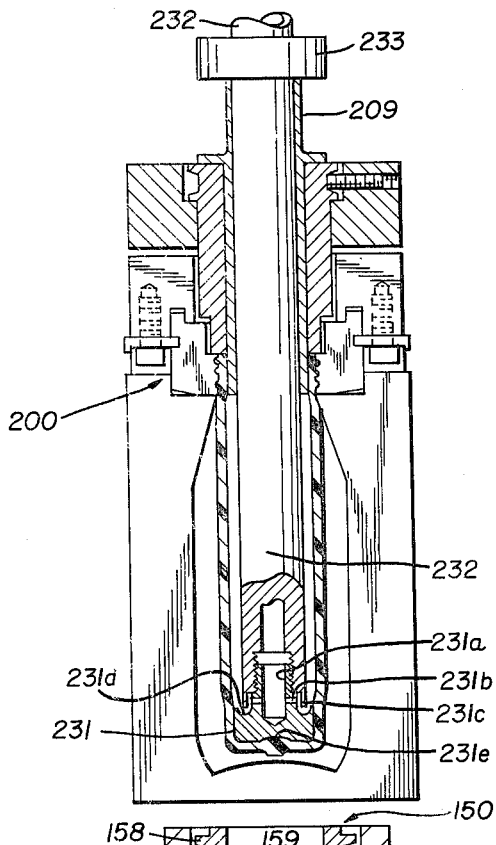

FIGURES 5, 6 and 7 are enlarged detailed views of the forming mechanism shown in FIGURE 2, with FIGURE 5 corresponding to the position of the parts in FIGURE 2, wherein the neck ring portion of the bottle is being formed, while FIGURE 6 shows initial break-away of the forming mechanism from the discharge opening. FIGURE 7 shows the formed bottle positioned within the closed mold halves and ready for blowing following positioning of the components in adjacency with the first blowing station.

Figure 4:
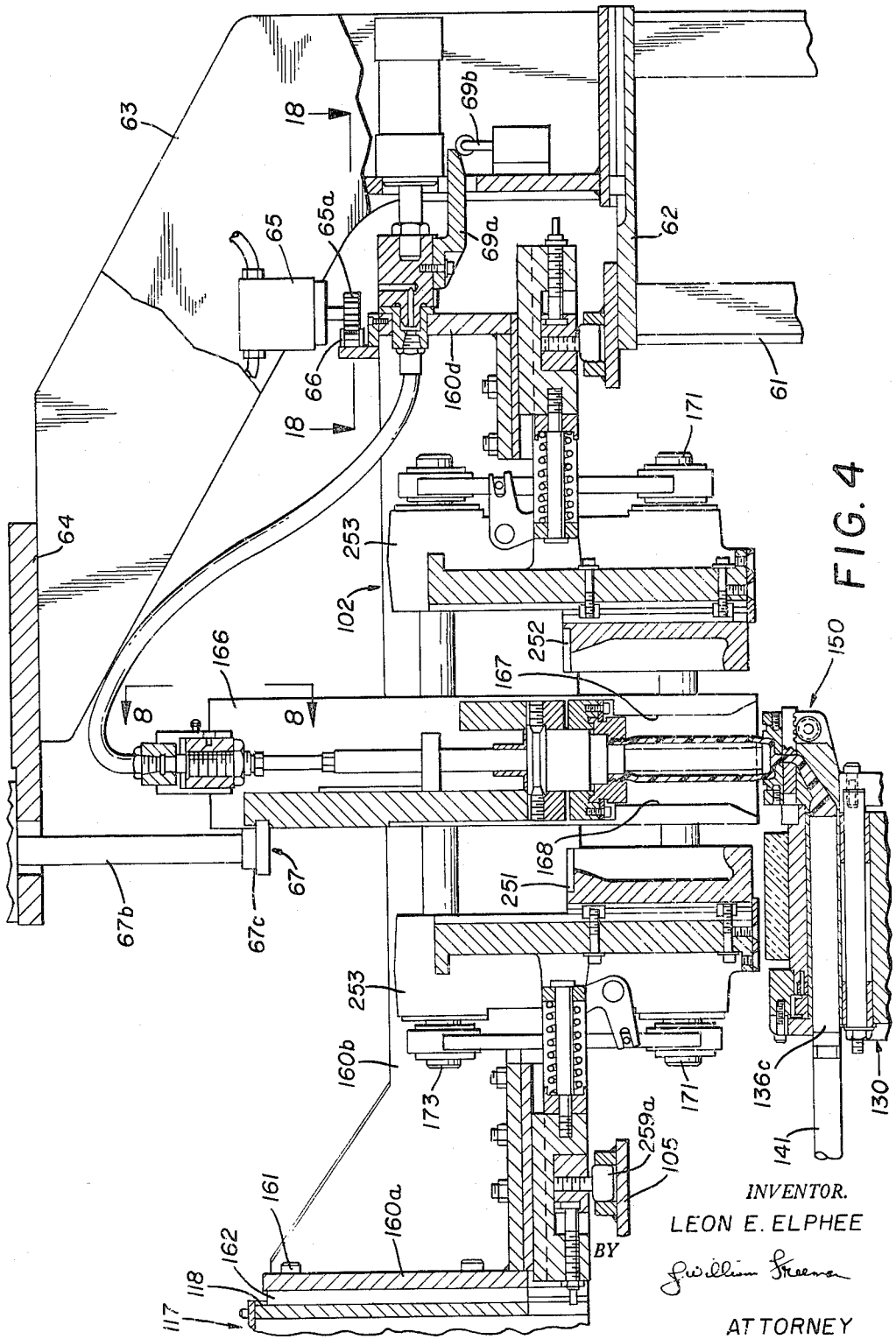
FIGURE 4 is a vertical section taken on the lines 4—4 of FIGURE 1 and showing the plastic in an advanced condition of formation from that shown in FIGURE 2.

FIGURE 8 is an elevational view taken on the lines 8—8 of FIGURE 4 and showing, in elevation, the retaining mechanism for the forming mandrel.

FIGURE 9 is a view similar to FIGURE 8, but showing the component parts in released position, with this released condition existing in the first and second blowing stations.

FIGURE 10 is an elevational section taken on the lines 10—10 of FIGURE 8.

Figure 1:
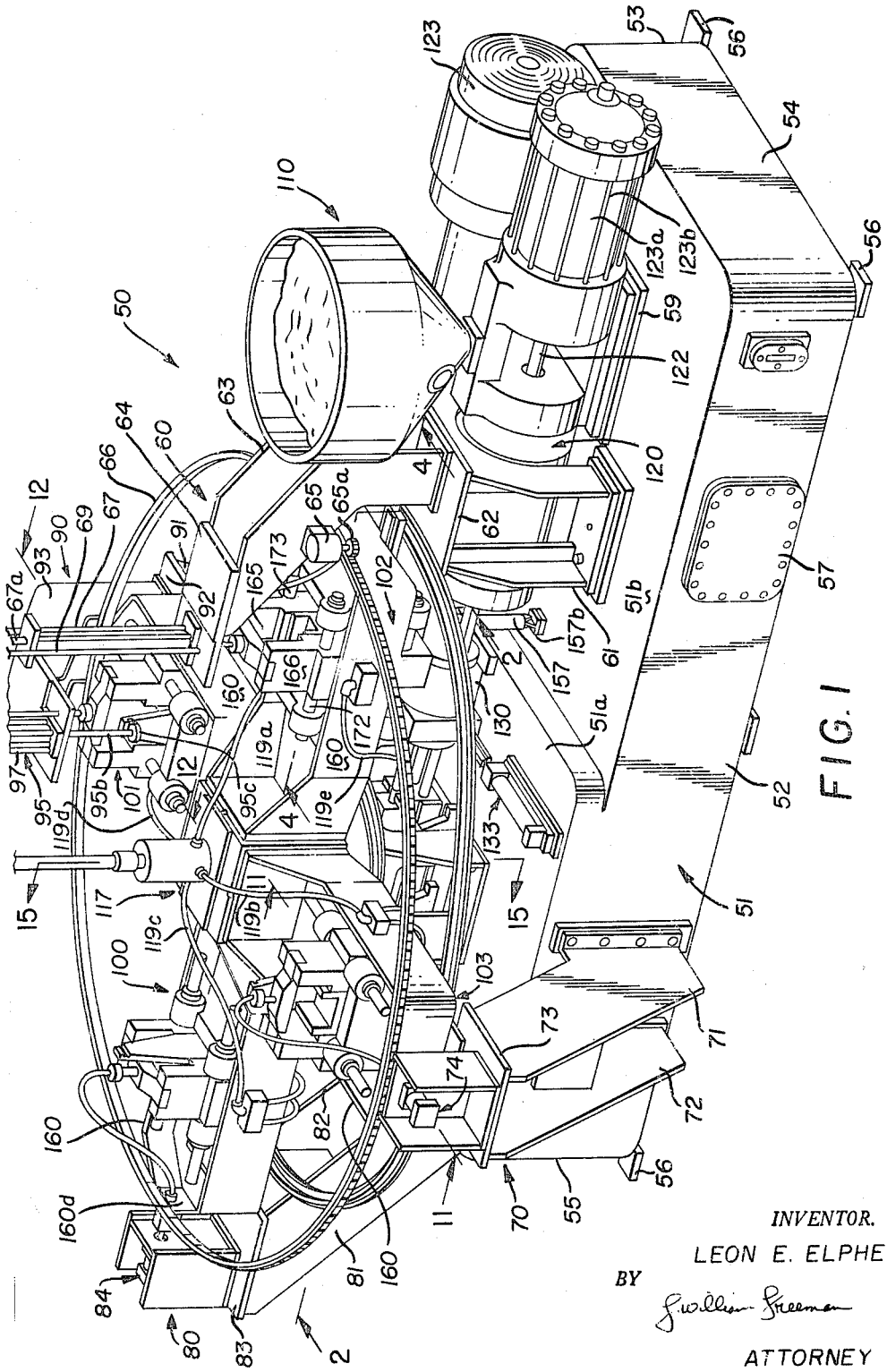
FIGURE 1 is a perspective view of the improved bottling machine.

FIGURE 11 is a vertical section taken on the lines 11—11 of FIGURE 1 and showing the position of the component parts in section in the first blowing station.

FIGURE 12 is a sectional view taken on the lines 12—12 of FIGURE 1 and showing the position of the component parts in the ejection station.

Figure 13:
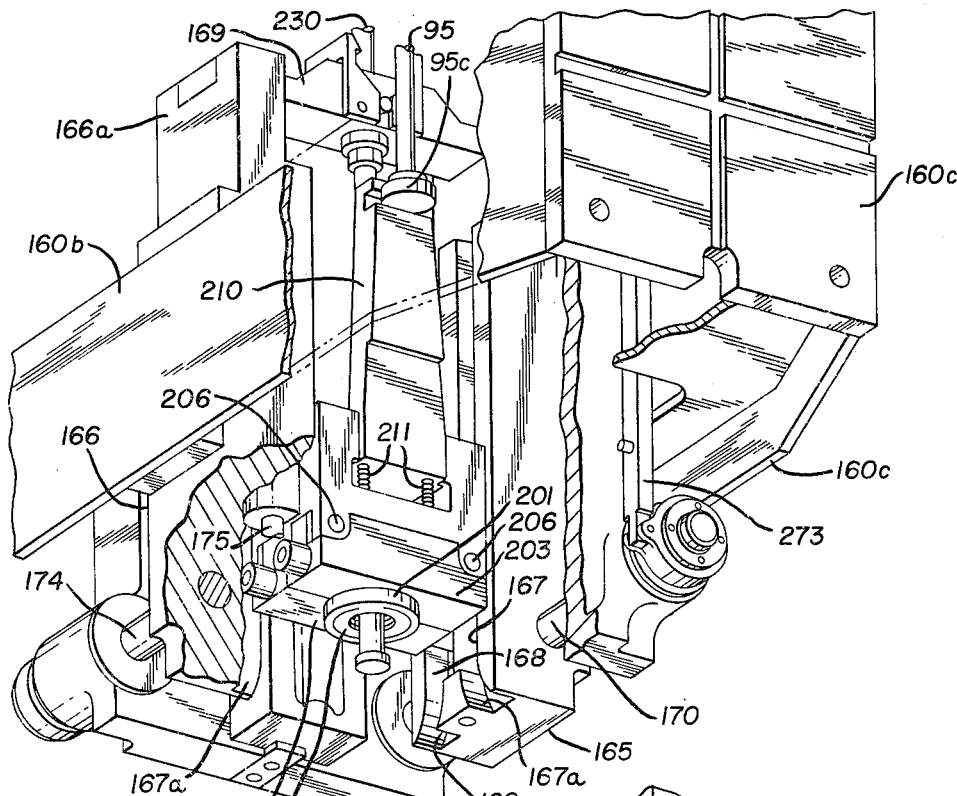

FIGURE 13 is a perspective view, partly broken away and in section, looking at the underside of the forming die during the period that the same is in closed position.

Figure 14:
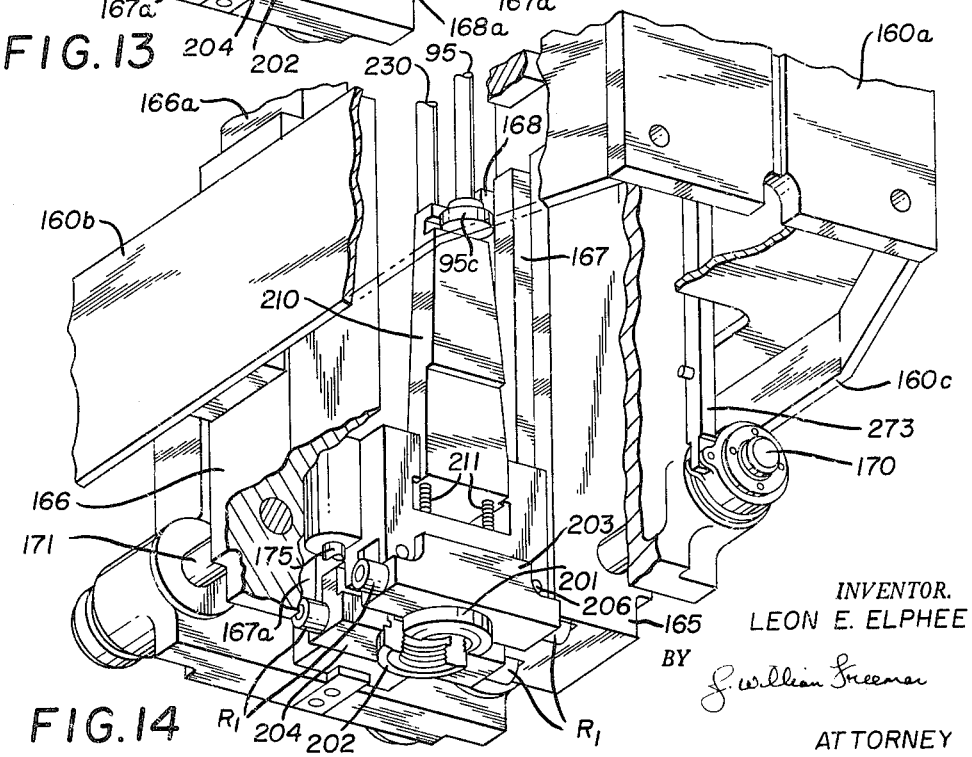

FIGURE 14 is a perspective view similar to FIGURE 13 but showing the position of the component parts at the ejection station.

Figure 15:
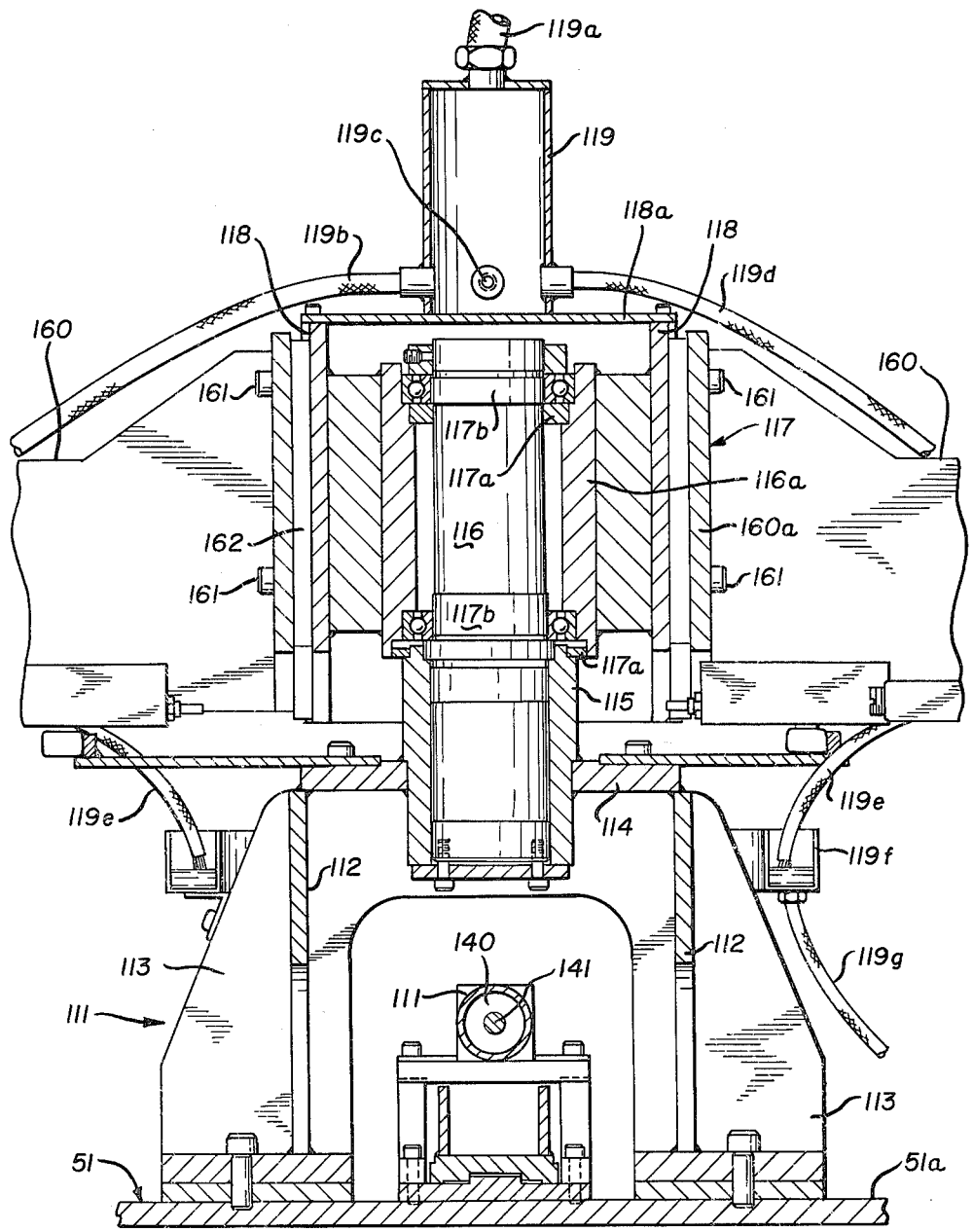

FIGURE 15 is a vertical section taken on the lines 15—15 of FIGURE 1 and showing the mechanism for supporting the turret arms in rotatable condition.

FIGURE 16 is an elevational view taken on the lines 16—16 of FIGURE 2 and showing, in end elevation, the indexible storage turret and the actuating cylinder for cutoff.

FIGURE 17 is a vertical section taken on the lines 17—17 of FIGURE 16.

Figure 18:
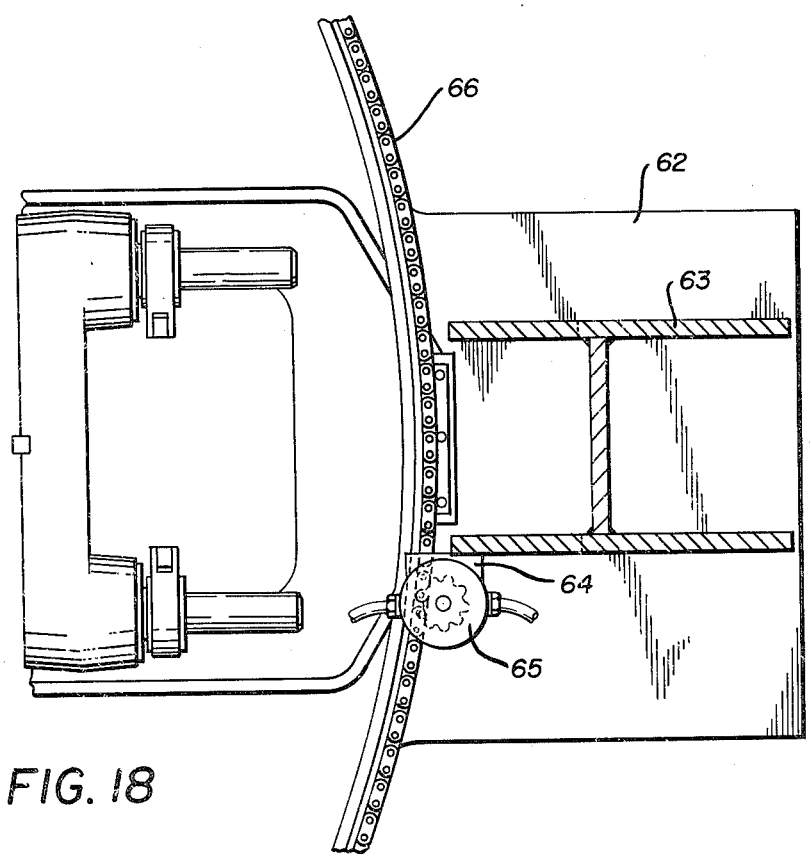

FIGURE 18 is a horizontal section taken on the lines 18—18 of FIGURE 4 and showing the driving mechanism for the machine.

Figure 19:
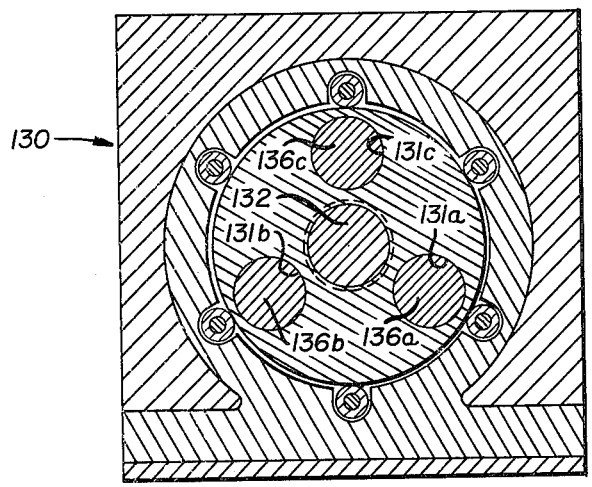

FIGURE 19 is a sectional view taken on the lines 19—19 of FIGURE 2 and showing a cross section of the three chambers of the indexible storage chamber.

FIGURE 20 is a vertical section taken on the lines 20—20 of FIGURE 2 and showing the mechanism for indexing the storage turret.

FIGURE 21 is a sectional view taken on the lines 21—21 of FIGURE 16.

Figure 22:
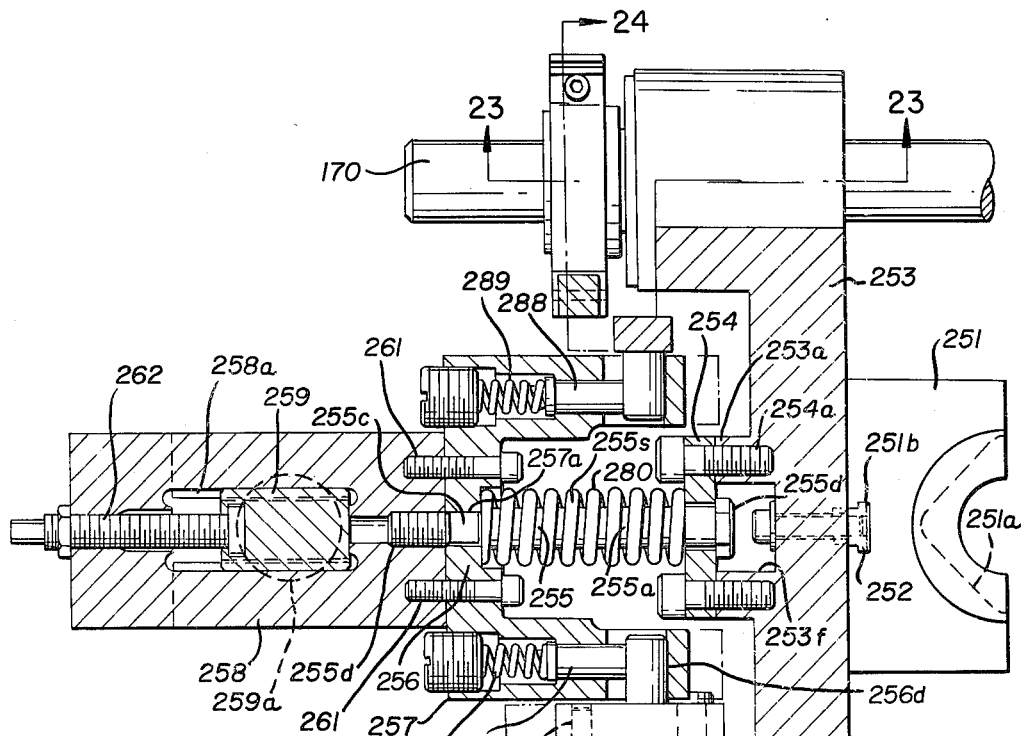

FIGURE 22 is a horizontal section taken on the lines 22—22 of FIGURE 2 and showing the construction of the moving and locking means for the mold sections.

Figure 23:
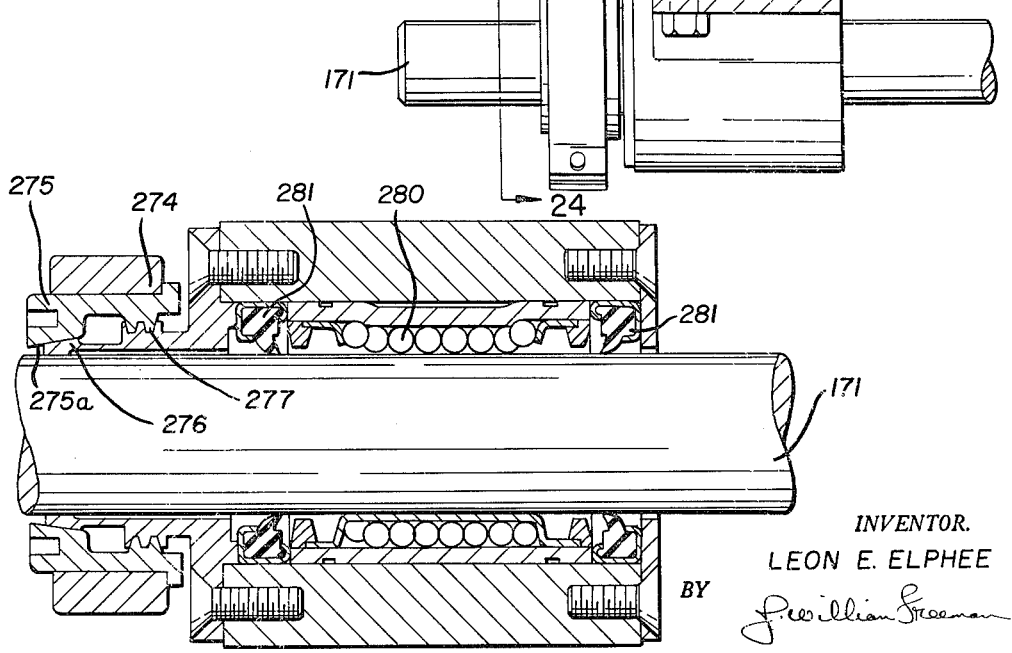

FIGURE 23 is a sectional view taken on the lines 23—23 of FIGURE 22 and showing the detailed construction of the locking collar.

Figure 24:
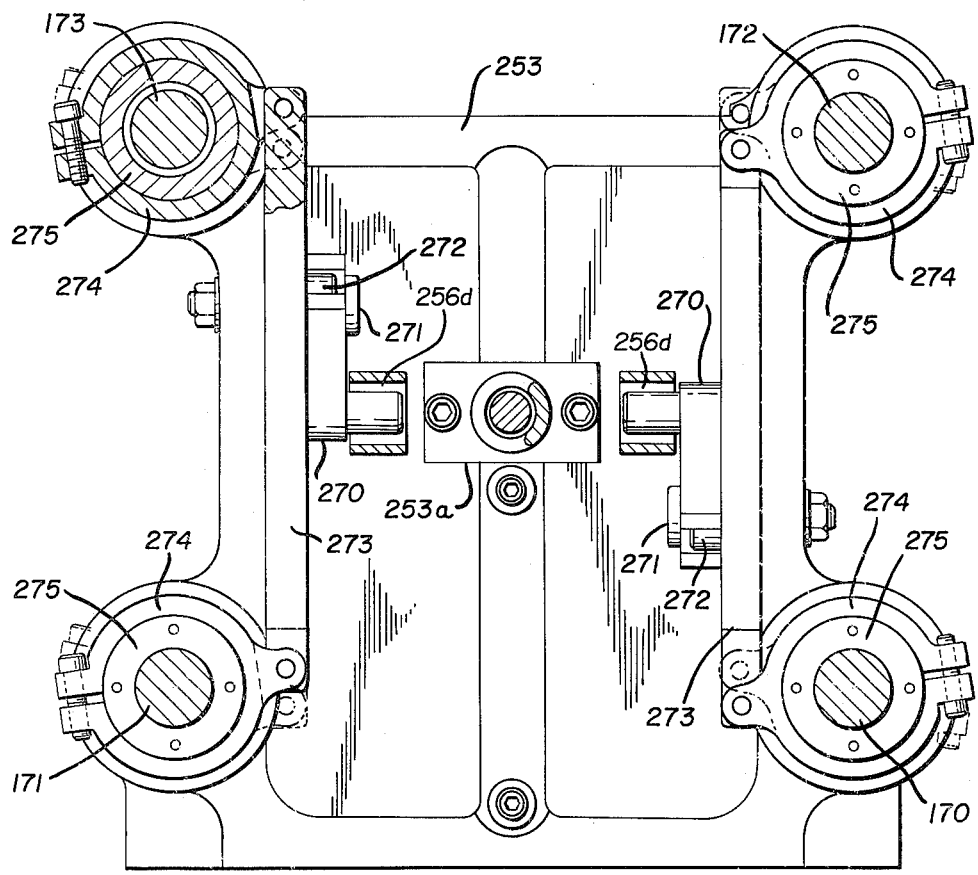

FIGURE 24 is a sectional view taken on the lines 24—24 of FIGURE 22.

Figure 25:
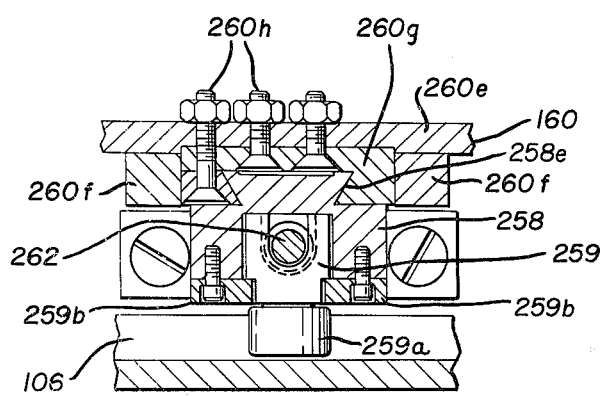

FIGURE 25 is a sectional view taken on the lines 25—25 of FIGURE 12.

Figure 26:
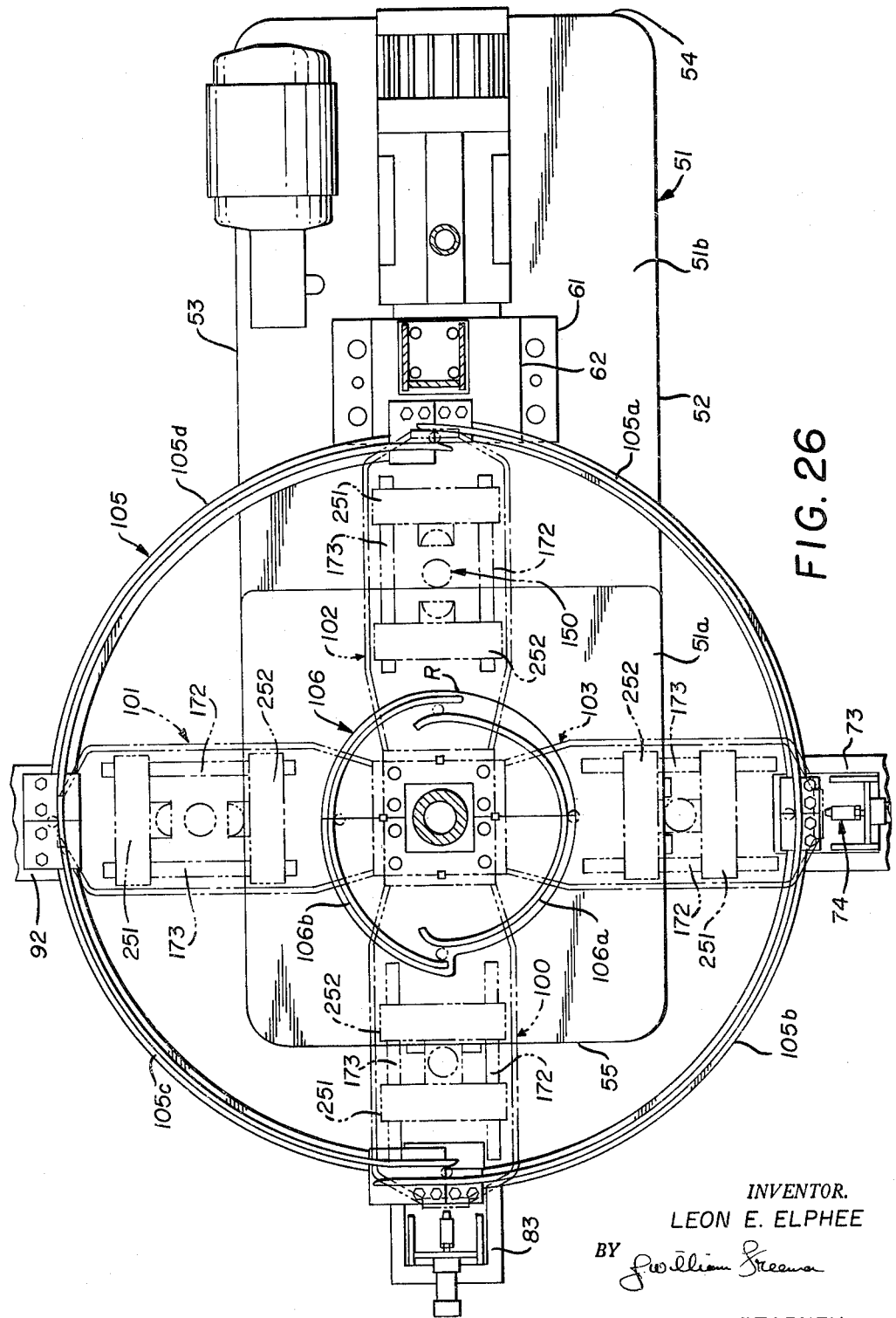

FIGURE 26 is a top plan view of the improved machine but illustrating the arms and platen positions in chain dotted lines and showing the camming mechanisms in full lines.

Figure 27:
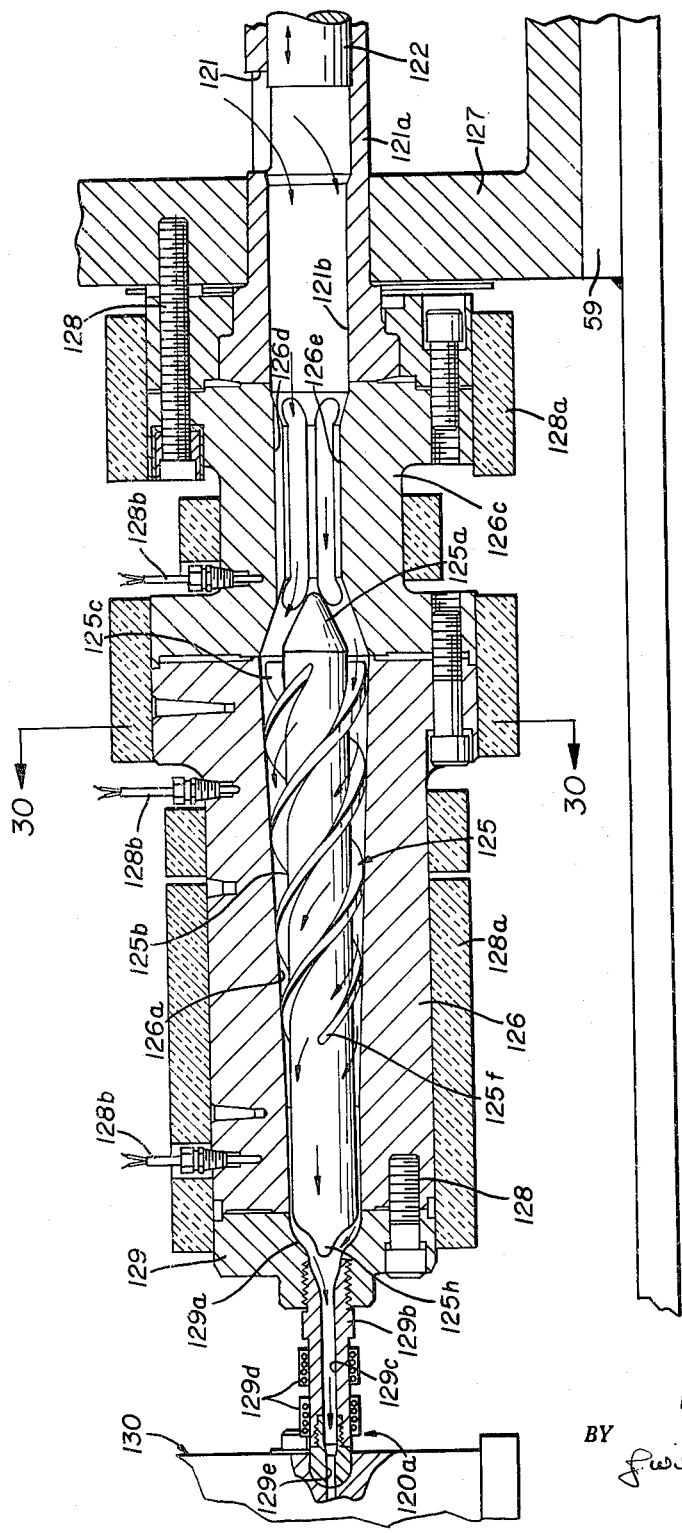

FIGURE 27 is a vertical section through the plasticizer or injection cylinder.

Figure 28:
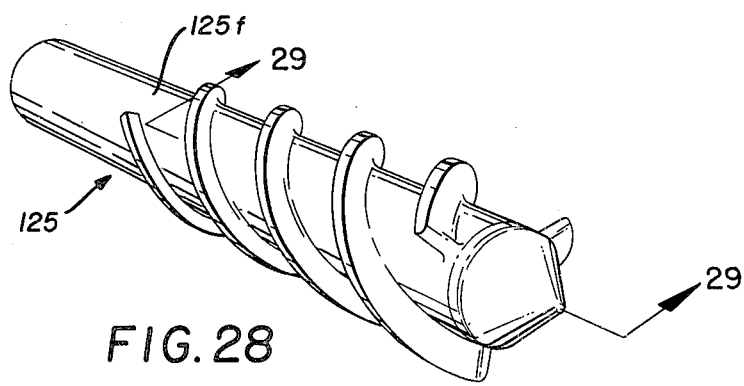

FIGURE 28 is a perspective view of the improved injection screw element.

Figure 29:
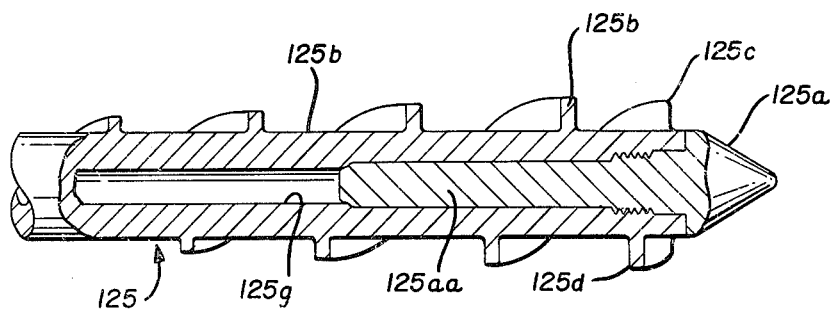

FIGURE 29 is a sectional view taken on the lines 29—29 of FIGURE 28.

Figure 30:
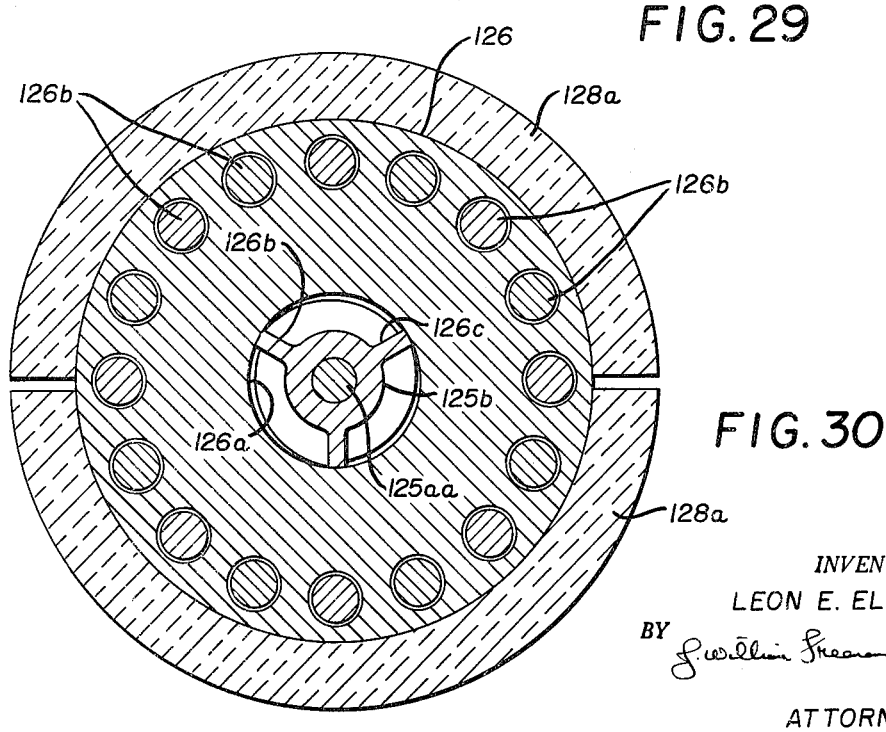

FIGURE 30 is a vertical section taken on the lines 30—30 of FIGURE 27.

FIGURES 31 through 36 are schematic views illustrating the position of the component parts at various stages during operation of the machine.

Figure 37:
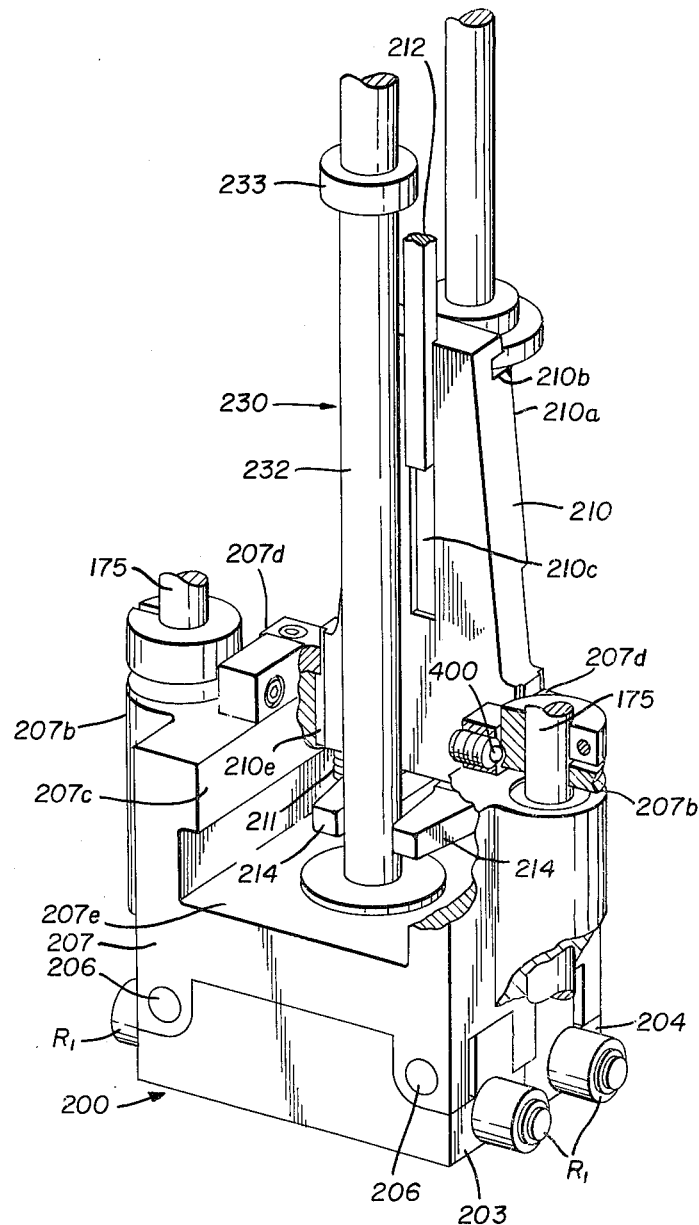

FIGURE 37 is a perspective view of certain components of the forming mechanism.

The detailed specification that follows is broken down into an initial description of the bottling machine followed by a description of the operation thereof, with each of the aforementioned subjects being subdivided into separate descriptions of the various components and operations for the sake of clarity.

DESCRIPTION OF BLOWING MACHINE

A. *General summary*

Because of the complexity of construction, it is believed that a proper understanding of the invention can best be obtained by first reciting a general description of component parts followed by a detailed description of the component parts involved.

Accordingly and referring first to FIGURE 1, the automatic blow machine, generally indicated by the numeral 50, includes a base 51 that fixedly supports operating stations 60, 70, 80 and 90 that are disposed 90 degrees from each other. Four identical turret arms 100, 101, 102, 103 each provided with identical mechanisms, are rotatable around a central support so that at all times the four arms will be aligned with the four operating stations just described to thus provide a sequence type of continuous operation.

In general essence, the requisite plastic material in granular form is introduced into a hopper 110 and is plasticized and extruded by an extruder 120. The material so plasticized in the extruder 120 is then delivered to an indexible storage cylinder 130 for emission through a discharge head 150 (see FIGURE 2) that is positioned in registered alignment with the components parts of the arm 102 in FIGURE 1, with arm 102 being aligned with forming station 60.

Material emitting from the discharge head 150 will accordingly be drawn upwardly in a thin cylindrical column as shown in FIGURE 4 and will be separated from the discharge opening so as to be freely positioned between the open mold halves. Following this shaping operation, the arm 102 will be indexed to the position initially occupied by the arm 103 in FIGURE 1 of the drawings so as to be aligned with the blowing station 70. During such clockwise movement of the arm 102 towards the station 70, the mold sections, which have been opened or separated will be moved towards each other so that when the bottle forming mechanism 102 reaches station 70, the mold halves will be in the closed position shown in FIGURES 7 and 11. During this time, the other arms 100, 101 and 103 will have each indexed clockwise 90 degrees to the next station that is positioned 90 degrees therefrom. When the cylindrical tube of plastic is in the position of adjacency with the blowing station 70, air is introduced through a rod that is positioned interiorly of the drawn plastic column and the bottle is thus blown outwardly to conform to the confines of the cavity defined by the mating mold halves.

Indexing of the arm 102 to the second blow station 80 permits a second blowing stage to be introduced, and when the arm 102 is finally indexed to a position of adjacency with the ejection station 90, the blown bottle will be lowered and discharged automatically from the machine, whereupon the arm 102 may return to forming station 60 for repetition of the above described cycle of events. It should be noted that during each 360 degree rotation of arm 102 for example, that a total of four bottles will be produced.

B. *Main framework of fixed components*

1. THE BASE

The structural configuration of the base 51 is best shown in FIGURES 1, 2, 15 and 26, with these figures revealing that the base 51 per se is of generally rectangular outline configuration in plan so as to include parallel top surfaces 51a and 51b, opposed side surfaces 52 and 53 and opposed end surfaces 54 and 55 (see FIGURE 1). The usual leveling support corners 56, 56 are provided on the four corners of the machine for leveling, while an access door 57 is provided on the surface 52 for the purpose of gaining access to the interior of the base, with electrical connections being facilitated through the use of known components. In addition to the aforementioned component parts, the surface 51b has welded thereto an elongate guide way 59 upon which the plasticizing cylinder 120 may be positioned in axially shiftable relationship as will be described.

2. THE FORMING STATION 60

The forming station 60 is shown fixed with respect to the surface 51b by attachment to a yoke shaped frame member 61 (FIGURE 1) positioned in straddling relationship to the plasticizing mechanism as clearly shown in FIGURE 1. The top plate 62 of frame 61 fixedly supports an angularly disposed support arm 63 that projects in overlying relationship to the discharge head 150 as is clearly revealed in FIGURES 1 and 4 of the drawings. Secured to the just described arm 63 are a platform 64 and a driving motor 65 with motor 65 having a drive gear 65a that meshes with a sprocket ring 66 (FIGURE 18) that is secured to the projecting ends of the arms 100, 101, 102 and 103. In this fashion, the motor 65 can index the arm members from station to station, in the requisite fashion. Supported on the pad 64 is a double ended hydraulic piston 67 shown partially in FIGURE 1 and illustrated schematically in FIGURES 31 to 35. The upward travel of upper piston rod 67a is limited by an adjustable arm 68 that is adjustably secured with respect to support rods 69, 69 that project upwardly from the pad 64 in fixed relationship therewith as shown in FIGURE 1, with schematic representation of these components being present in FIGURES 31 to 35. The lower portion 67b has a ring 67c provided on its lower end for engagement with actuating components of arm 102 as will be described later.

Referring now to FIGURE 4, the arm 63 further includes an air pressure source 69a of conventional design that is provided in known fashion to supply air to the respective arm members when they are in a position of adjacency with the station 60 with microswitch 69b serving to control the entry of such air, dependent upon the position of aligned adjacency between the arm and the forming station 60.

3. THE FIRST BLOWING STATION 70

The first blowing station 70, is most clearly illustrated in FIGURES 1 and 11 of the drawings, with these views serving to indicate that the molding station 70 includes projecting support arms 71 and 72 that are fixed to the face 52 of base member 51 in known fashion, and which further connect with a horizontally positioned support pad 73 that is firmly secured as by welding, to the upper end of the projecting arms 71 and 72.

The just described pad 73 supports an air source 74, with this air source 74 being best shown in detail in FIGURE 11 of the drawings, and with the air source 74 being preferably of higher pressure than the previously described air source 69a, which only requires minimal pressure (about 3 lbs.) to form an air column around the forming mandrel as will be described. Accordingly, and recognizing the pressure differences just described and referring to FIGURE 11 for description purposes, the air sources 69a and 74 will each include a head 75 that is mounted on the piston rod 76 of cylinder 76a, with cylinder 76a being fixed with respect to pad 73 in known fashion. The head 75 has the usual projecting nozzle 77 that defines a cavity 77a that communicates with a source of pressurized air through line 78. A bracket arm 79 is fixedly secured to the underside of the head 75 so as to be shiftable therewith, with such shifting movement serving to actuate the micro switch 79a and thus initiate or terminate air pressure through line 78. In this regard, the micro switch 79a is normally depressed by arm 79 when the unit 74 is in its retracted position.

4. THE SECOND BLOW STATION 80

As has previously been indicated, the second blow station 80 merely augments the blowing operation that is effectuated in the overall operation of the machine 50, and accordingly, the same preferably duplicates the structure of the first blowing station 70, with arms 81 and 82 projecting from face 55 of base 51 as shown in FIGURE 1 so as to support a pad 83 that, in turn, support the air inlet unit 84 which preferably corresponds in detail to previously described members 69a and 74.

The use of two blow stations is believed significant because it reduces the cycle time between each operation. In this regard, the blowing time usually controls the time interval between indexing of the machine. By use of the two stations, the time for blowing at each station can be reduced by half. Further reduction of such time interval would be achieved by making three or more blow stations if the material being used required such for minimum intervals of time between indexing.

5. THE EJECTION STATION 90

The ejection station 90 is best shown in FIGURES 1 and 12, with this station 90 including projecting arms 91, 91 that support a pad 92 that, in turn, supports angularly inclined arm members 93, 93 (see FIGURE 12). The just described arm members 93 have their projecting ends overlying the center line of the molding mechanism that is positioned adjacent thereto, and to this end, the same support a pad 94 that, in turn, supports a double ended hydraulic cylinder 95 that is of substantially identical in detail to the piston or cylinder 67 previously described in connection with the forming station 60. Accordingly, the cylinder 95 includes an upper piston rod 95a and a lower piston rod 95b, with the upward travel of piston rod 95a being limited by an adjustable cross bar 96 that is shiftably positioned with respect to the support rods 97, 97.

Figure 36:
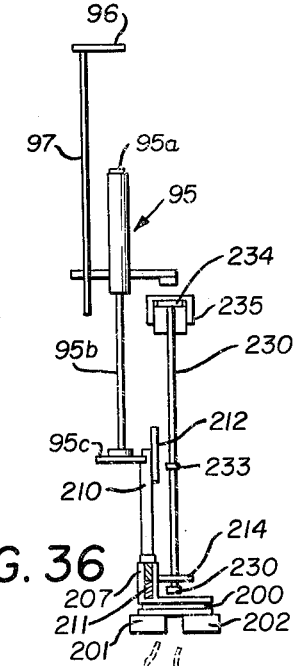

As before, a ring 95c (FIGURES 1 and 36) is provided on the lower end of piston 95b for coaction with the arm positioned adjacent thereto as will be described later. In this regard, while portions of the just described mechanism are shown in FIGURE 1, FIGURE 36 schematically illustrates the same in their entirety.

6. THE CAMMING TRACKS

It has been previously indicated that the mold halves are automatically shifted between open and closed positions during indexing of any one molding arm 100, 101, 102 and 103 from station to station as described. The arrangement effectuating this camming action is best shown in FIGURE 26 of the drawings. In general principle, there are outer and inner guide tracks that are given the general designation 105 and 106, respectively (FIGURE 26).

Considering first the outer track section 105 and referring to FIGURE 26, it will be noted that the track section is of generally T-shaped cross section so as to serve as a guide for guide rollers that are provided on the various molding arms 100, 101, 102, and 103, with such contact between rail 105a and a guide roller being clearly shown in FIGURE 12, for example.

Accordingly, and referring again to FIGURE 26, the guide track 105 is shown as including arcuate segments 105a, 105b, 105c and 105d, with each of the aforementioned sections 105a, 105b, 105c and 105d having its arcuate ends provided with appropriate mounting pads to facilitate attachment to the support pads 62, 73, 83 and 92, as clearly shown in FIGURE 26. In this regard, it will be noted that the curvature of the sections is arranged so that the sections 105a and 105b arcuately overlap the ends of the sections 105d and 105c, respectively. Thus, the guide roller element of any one forming will ride against the radially innermost surface of the rail sections 105a and 105b so as to, in effect, move the outer mold halves toward the center of rotation of the machine 50. However, upon leaving the blow station 80, the guide roller will move to the outside of track sections 105c and 105d so as to effectuate radially outward movement of the outer mold half.

As is indicated above, the guide track or rail 106 is intended to complement the just described camming action effectuated by the camming track 105 and accordingly, and to this end, the same includes camming tracks 106a and 106b, with camming track 106b having its arcuate ends in overlying relationship to the arcuate ends of the camming track 106a. Thus, in moving from station 60 to station 70, the guide roller indicated by the letter R in FIGURE 26 will be moved radially outwardly so as to move the inner mold section radially outwardly for registry with the inwardly moving outer mold half. During the opening of the molds, the guide roller R will ride against the inner surface of section 106b so that the inner mold half will move toward the center of the machine, while the outer mold half is moving outwardly for separation purposes.

C. *The revolving mold support*

It has been previously indicated that the various molding mechanisms 100, 101, 102 and 103 revolve around an axis of rotation and accordingly, and having particular reference to FIGURES 1, 2, 15 and 26, it will first be noted that the base 51 supports on the surface 51a thereof an upright projecting stand that is generally indicated by the numeral 111 in FIGURE 15 of the drawings, with this base including the usual upright walls 112, 112 that are reinforced by angle brackets 113, 113 and that support a horizontally positioned pad member 114 as clearly shown in FIGURE 15. The pad 114 is further apertured to fixedly support a trunnion 115 within which may be journaled a cylinder 116, with the upper end of the cylinder 116 being journaled in the bushing 116a of the upper housing member that is designated generally by the numeral 117. It is understood that the usual packings 117a and 117a and ball bearings 117b and 117b are provided for journaling the bushing 116a with respect to the shaft 116.

Additionally, and as shown in FIGURE 15, the upper housing 117 is again of four sided configuration so as to include wall surfaces 118, 118 that are provided in opposed parallel relationship with each other for mounting of the support elements of the molding arm mechanisms 100, 101, 102, and 103, with these surfaces being appropriately machined with grooves so as to facilitate aligned mounting of the arm embers as will be described.

In addition to the aforementioned component parts, the housing 117 further includes an upper cover plate 118a that supports thereon a cylindrical housing 119, with this housing serving as a reservoir for water entering through line 119a and with the water emitting from the chamber 119 through lines 119a, 119b, 119c and 119d (see FIGURE 1). Water so emitted will go through the cooling jackets of the mold sections and be returned through a typical return line such as the lines 119e, 119e, as shown in FIGURE 15, with four such lines being provided with each of the molding sections, and with the lines emitting into a circular trough 119f from which the same may be drained through line 119g (see FIGURE 15).

From the above structure, it is apparent that the arms 100, 101, 102 and 103 each project from and rotate around an axis of rotation defined by the axis of rotation of cylinder 116.

D. *Material preparation equipment*

The material preparation equipment has been generally indicated in the preceding GENERAL SUMMARY as including a hopper 110 and a plasticizer 120, with these component parts, in essence, serving to mix the plastic material into a heated flowable condition so that the same may be delivered to the material delivering equipment as will subsequently be described.

Accordingly, and referring first to FIGURE 1, the hopper 110 is shown as being of the usual funnel-shaped configuration so as to deliver raw unplasticized material to the top portion of the injection type plasticizing cylinder 120, as will now be described.

No detail is undertaken with regard to the description of the feed mechanism for delivering the unplasticized pellets from hopper 110 with it being sufficient to say for the purposes of description that a standard feeding mechanism is employed to deliver a predetermined charge of such unplasticized pellets through the opening 121 (see FIGURE 27) of the plasticizing cylinder 120. In this regard, and having referenece again to FIGURE 1, it should be noted that in actual fact, the plasticizing cylinder unit 120 includes a reciprocal ram 122 that is reciprocated by hydraulic pressure supplied by pump 123, with the piston being housed in the cylindrical chamber 123a that has its ends connected by the tie rods 123b, 123b. All of the just described portions are not shown in FIGURE 27, with the section of FIGURE 27 showing only the left hand portion of the injection cylinder and showing specifically the area in which the unplasticized pellets are heated to a flowable form for subsequent use in the blow molding operations.

Accordingly, and now referring to FIGURE 27, it will be seen that the ram 122 overlies the opening 121 so that a charge of pellets may be delivered through the opening 121 ahead of the retracted ram 122. When the ram moves to the left of FIGURE 27 these pellets will be driven accordingly to the left and the opening 121 covered.

It must be understood that the above described process is repetitive and that pellets are in constant stages of increasing plasticity with final plasticizing occurring upon reaching of the discharge end 120a as shown in FIGURE 27.

One of the salient features of the invention herein being disclosed relates to the use of a new and improved type of separator unit that is indicated generally by the numeral 125 in FIGURE 27 and that is shown in perspective and cross section in FIGURES 28 and 29, respectively.

This separator element 125 is received in the tapered bore 126a of a heating cylinder 126, with the usual tie bolts 126b, 126b extending longitudinally of the cylinder 126 as clearly shown in FIGURE 30 of the drawings. An intermediate cylinder 126c is provided between the cylinder 126 and the cylinder 121a that includes the opening 121. In this fashion, pellets will be directed through opening 121 into the bore 121b of the cylinder 121a. These pellets are then directed toward the nose end 125a of the separator 125 through flutes 126d that are provided in the bore 126e of the cylinder 126c, with the direction of pellet movement being clearly indicated by the arrows provided in FIGURE 27 of the drawings.

A support flange 127 (see FIGURES 1 and 27) serves to mount the just described component parts with respect to the guideway 59, with a sliding way type of arrangement being contemplated so that the entire unit may be retracted with respect to its discharge position to thus permit access to other adjacent components. Additionally, the component parts just described are fastened together by the use of screws 128, 128 that draw the flange portions thereof together as clearly shown in FIGURE 27 of the drawings, while encircling heating elements 128a, 128a are also provided for heating purposes in known fashion. Thermocouples 128b, 128b are preferably provided for observing temperature in known manner.

Referring now to FIGURES 27, 28 and 29 for a detailed description of the separator 25, it will first be seen that the same includes a cylindrical body 125b that has three lead threads 125c, 125d and 125e provided thereon and with these threads progressively decreasing in pitch diameter so as to be press fit into the tapered bore 126 with the peripheral edge of the threads tapering from a large pitch diameter adjacent nose end 125a to a minimal diameter pitch adjacent the inboard end 125f.

It should be noted, however, that the root diameter, as defined by the diameter of body 125b, remains constant, so that the chambers defined by the threads and the bore 126a, progressively decrease in volume towards inboard end 125f. In this fashion, the advancing material will be progressively compressed.

It has also been found that the use of a triple lead thread has proved very beneficial in obtaining full plasticizing of the plastic pellets since the use of this triple lead thread in a horizontal type machine makes each pellet travel through the same heat zones so that all pellets are plasticized equally. Stated otherwise, if pure longitudinal flutes were provided on the separating element as has been done in the past, it is obvious that the pellets on the top would be subjected to greater heat during plasticization than would be pellets passing through the bottom flutes because of the known fact that heat rises to make the top region of the separator cylinder hotter than the bottom region. By using a triple lead thread, however, as just described, it has been found that all material is uniformly plasticized.

Referring to FIGURE 29, it will be noted that the nose end 125a is, in reality, preferably separable from the main body portion 125b, which the body portion 125b being provided with a bore 125g within which the shank portion 125aa of nose 125a may be threadingly received as clearly shown in FIGURE 29 of the drawings. Also, the material of the nose 125a is preferably berylium for the purpose of drawing the maxium heat towards the nose portion of the separator unit 125. Again referring to FIGURE 27, it will be noted that the inboard end 125h of the separator 125 is formed towards a point of complementary registry with the tapering cavity 129a that is provided in the end closure piece 129. An auxiliary delivery tube 129b is threaded into the projecting end of the closure cap 129 so that the opening 129c thereof may be aligned with the opening 129a of the storage turret 130, so as to permit delivery of the plasticized material in the direction shown by the arrows. Heaters 129d, 129d encircle the just described auxiliary delivery tube 129b to keep the plastic therein flowable condition during storage therein, with the delivery tip 129e thereof being threaded to the end of the member 129b for discharge cooperation with the indexible storage turret 130 as will now be described.

E. *Material delivery equipment*

1. THE INDEXABLE STORAGE TURRET

Material so plasticized as just described is shown entering the storage turret 130 at the right hand edge of FIGURE 21 of the drawings, and accordingly, reference is made to FIGURE 21 of the drawings as well as to FIGURES 1, 2, 4 and 16 through 20, inclusive, for a detailed description of the mechanism that handles the material from its plasticized state and effectuates delivery of the same to the forming mechanism as will subsequently be described.

By way of general explanation preceding detailed description of component parts, it should be noted that the material storage unit 130 includes a revolving turret member that is generally given the numeral 131 in FIGURE 2 of the drawings, with its turret member preferably having three cylindrical storage chambers 131a, 131b and 131c provided therein for indexed movement between LOADING, STORAGE and DISCHARGE position. The just described chambers extend longitudinally of the turret in parallelism with the axis of rotation thereof, which axis of rotation is defined by the center line of support cylinder 132 as viewed in FIGURES 2, 19, 20 and 21. As indicated, the just described chambers 131a, 131b and 131c are each indexible by ratchet mechanism 133 (FIGURE 20) between positions for (1) receiving a charge (2) storing a charge and (3) a discharge station, with the chamber 131a being positioned in the LOAD position in FIGURES 19 and 20, while the cylinders 131b and 131c are respectively positioned in STORAGE and DISCHARGE positions in FIGURE 20. Accordingly, in this fashion, the cylinder 131a is in co-axial alignment with the members 129b and 129e as clearly shown in FIGURE 21 of the drawings while the cylinder 131c is in co-axial alignment with the ejector piston 141 as shown in FIGURE 2 of the drawings where discharge is taking place.

As previously indicated, the shaft 132 is carried by an upright support arm 132a that is fixed with respect to the base 51 so as to rotatably support housing 132d within which are provided the storage chambers 131a, 131b, and 131c as clearly shown in FIGURE 2 of the drawings. The opposite end of the shaft 132 is concentrically encircled by a driving ring member 132b, with this ring member 132b having teeth 132c as clearly shown in FIGURE 20 of the drawings. The teeth just described are intended to mesh with a gear rack 133 that is slidably mounted on a pad 133a that has its path of movement defined by way of members 133a and 133b that are secured to a pad 133c that is, in turn, secured to the base 51, as clearly shown in FIGURE 2 of the drawings. In this fashion reciprocation of the gear rack between the full and chain dotted line positions of FIGURE 20 will result in rotation of the storage chambers 131a, 131b and 131c exactly 120 degrees.

To achieve such rotational drive, a pawl 134 is provided on the driving ring 132b and is urged into releasable engagement with notches 134a, 134a that are provided on the housing 132d that rotates around shaft 132 and defines chamber members 131a, 131b and 131c. A spring detent 134c retains the dog or pawl 134 normally in place with the dog 134 serving to permit clockwise rotation (FIGURE 20) but preventing counterclockwise rotation. The control of the degree of stroke necessary for rotational purposes is by an adjustable stop member 135 provided on the pad 133c as clearly shown in FIGURE 20, with cylinder 135a having its rod 135b reciprocal for shifting of the gear rack 133.

In addition to the aforementioned parts, each chamber 131a, 131b and 131c includes its own actuating rams, with the rams or rods for the chambers 131a, 131b and 131c being respectively designated by the numerals 136a, 136b and 136c, and with these rams being reciprocable within their respective chambers for the purpose of controlling the entrance and discharge of plastic material therefrom.

Thus, and during loading of the chamber 131a as shown in FIGURE 21, the rod 136a is initially fully within the empty storage chamber 131a. However, as plastic enters chamber 131a under pressure, the rod 136a will be pushed out of the chamber to its chain dotted position in FIGURE 21, where the projecting end thereof has engaged the hardened surface 138a that is provided on the upright support member 138, with the member 138 being shiftably attached to the base 51 and with adjustment of the longitudinal position of plate 138a being controlled as will subsequently be described.

While the rod 136a of chamber 131a is in its extended position as shown in chain dotted lines in FIGURE 21, it will be noted from FIGURE 4 that the rod 136c is moving inwardly with respect to the chamber 131c so as to discharge the plastic contained therein while the chamber 131c is in registry with the discharge opening 150, with the rod 136c being co-axially aligned with the piston rod 141 so as to be moved to the right of FIGURE 2 in response to the movement of piston rod 141 to the right of FIGURE 2.

Also, and at the same time, the rod 136b will remain in its extended position that occurred during loading, with the projecting end thereof merely having slid over the hardened surface 138a during rotation of the turret 131.

Thus, and with reference to FIGURE 2, during the LOADING operation, the ram or plunger rod for the chamber aligned with the end 129b, will be moved to the left and will remain extended during the time it is in STORAGE position. However, when this extended rod is moved co-axial alignment with the piston rod 141 upon movement of the chambers to DISCHARGE position, movement of the piston rod 141 to the right will force the rod into the chamber to cause the material therein to be expelled with initial expelling of such material being shown in FIGURE 2 and with a further state of expelling being shown in FIGURE 4 of the drawings.

2. THE ACTUATING MECHANISM FOR THE DISCHARGE RODS 136a, 136b, 136c

The mechanism actuating rods 136a, 136b, and 136c for discharge purposes as just described is shown best at the left hand portion of FIGURE 2 as well as in FIGURE 15.

Accordingly, and first referring to FIGURE 15, a double ended cylinder 140 is shown positioned within housing 111, with the piston 140 being fixed with respect to support members 138 so as to be slidable longitudinally of base 51 as will be described.

In this fashion, the forward piston 141 can move the various discharge rods to the right of FIGURE 2 to effectuate ejection of plastic from chamber 131c.

In this regard, it is the rear piston 141a that serves to adjust the stroke of each ram or discharge rod 136 and accordingly, and referring to FIGURE 2, it will be noted that the piston 141a includes a collar and rod unit 141b that is threaded onto the rearward end of piston 141a. In this fashion, the tip portion of unit 141b will strike the micro switch 141c to terminate movement to the left of FIGURE 2, while the collar portion of unit 141b will strike the micro switch 141d to terminate the movement of piston 141 to the right.

For the purpose of adjusting the longitudinal point on base 51 at which the just described reciprocal uniform stroke will commence and terminate, a conrol block 142 is provided in shiftable relationship to a guide way 143 that is, in turn, attached, in known fashion, to the base member 51, with the guide block 142 having a threaded bore within which the threaded shaft 144a of an adjustment member 144 may be received. In this fashion, rotation of the shaft 144a will cause linear advancement of the block 142, piston 140 and support plate 138, along the track 143 so that the position of stop surface 138a may be varied for various size charges. Additionally, the collar and rod unit 141b are threadingly adjustable with respect to the end of the rod portion 141a to provide for adjustment with reference to the length of stroke.

3. THE DISCHARGE HEAD AND ACTUATION THEREOF

The discharge opening has been previously indicated generally by the numeral 150 and if reference will be made to FIGURES 2, 4, 5, 16 and 17, it will be seen from FIGURE 2 that, in fact, the same includes a block-like member 151 that is fixed with respect to the upright support 132a (FIGURE 2) so as to have the passageway 152 thereof positioned in alignment with the end of the chamber 131c. Referring next to FIGURE 17, it will be seen that the top face 151a of the block member 151 is undercut as at 153 to provide a slide for a shut-off member 154, with this shut-off member 154 being reciprocal longitudinally of the slot by virtue of having teeth 154a provided thereon for meshing engagement with a gear 155, and with gear 155 being rotated by virtue of pivotal connection, through line 156, to the adapter end 157a of the cylinder 157, and with this cylinder 157 being pivotally mounted on pad 157b that is, in turn, fixed with respect to the surface 51b of base 51 (see FIGURES 1 and 16). The just described shut-off member 154 has an opening 154b provided therein so as to either have the same in registry or out of registry with the discharge end of the opening 152, with the opening 154 being in alignment with the end 152 in the full line position of FIGURE 17 and being out of alignment in the chain-dotted line position thereof as shown in FIGURE 17.

A finish die block 158 overlies the just described opening 154 so as to serve as a seat for the finished die and further includes a flow cavity 159 within which the emitting plastic may be guided during the initial forming operation, as will be described (see FIGURE 5).

F. *The blow molding mechanism*

1. GENERAL DESCRIPTION

It has already been indicated in the preceding paragraphs that there are identical arms carrying identical bottle forming mechanisms, with such arms having been generally indicated by the numerals 100, 101, 102 and 103.

Since each of these units will be exactly alike in construction so as to facilitate consecutive use of each mechanism at the respective stations, a detailed description will be undertaken only with respect to one unit, with it being understood that the remaining units will be similarly constructed.

By way of general description, each bottle forming mechanism will, in general, include a plurality of elongate support arms that are each fixed with respect to the central support 117 (FIGURE 15) so as to project radially therefrom, with the support members serving to support (1) a relatively movable finish die 200 (2) a blowing rod 230 and (3) separable mold halves 250 and 251, with the just described relatively moving parts moving relatively of the support members in response to rotational movement around the axis of the bottling machine 50.

2. THE SUPPORTING MEMBERS

Referring first to FIGURE 1, it will be seen that, in essence, each bottle forming arm mechanism includes a box-like support member indicated generally by the numeral 160, with such support member 160 having an integral end wall 160a that is bolted against faces 118, 118 as shown in FIGURE 15, with the usual bolts 161, 161 serving to effectuate attachment and with a key 162 (FIGURES 1 and 26) being provided for aligning the faces of the members 118 and 160a in registry with each other.

In this fashion, opposed side plates 160b and 160c will project radially outwardly from the axis of rotation of the machine, with these faces being disposed in substantial parallelism and terminating at their outboard end in a connecting wall 160d (see FIGURE 1). Rigidly secured to the inner faces of the walls 160b and 160c in opposed relationship are a pair of opposed support members generally designated by the numerals 165 and 166, with these support members being of identical configuration, although being formed in opposite hand relationship to each other.

The function of the support members 165 and 166 is several fold as follows.

First, the same serve as a guide way for the mating halves of the finish die 200.

Second, the same serve as a guide way for the mechanism that vertically reciprocates the finish die 200.

Third, the same serve to shiftably support the blowing rod mechanism 230 together with the actuating components for the same.

Fourth, the supports 165 and 166 serve to support the guide supports upon which the mold halves are shifted between open and closed position and additionally in this connection serve to support the locking mechanism for the same.

Fifth, the same serve as a support to hold the finish die 200 in elevated position and further to cam the halves of the finish die 200 apart from each other during positioning at the ejection station.

Accordingly, and referring now to FIGURES 13, 14 and 37 of the drawings, the main supports 165 and 166 are shown as being of elongate block-like configuration, with each said support having parallel ways 167 and 168 within which the rollers R1, R1 of the finish die 200 may ride with these ways being divergently flared at the lower end of each block as indicated by the numerals 167a and 168a in FIGURE 13 of the drawings.

Accordingly, it will be seen from the above that the mating halves of the finish die 200 may ride up and down in the grooves 167 and 168 in closed condition with separation being effectuated at the ejection station as will be described during the sequence of operations hereinafter to be enumerated.

It has also been indicated that the support members 165 and 166 serve to provide support for the blowing rod 230 and to this end the upper ends 165a and 166a thereof are notched (FIGURE 13) to receive a support element 169 that extends transversely thereof for shiftably supporting the blowing rod 230 as well as certain locking mechanism that prevents shifting of the blowing rod 230 when the same is positioned adjacent the forming station 60 as will hereinafter be described (see FIGURES 8, 9, 10 and 13).

To the end of shiftably supporting the mold halves 250 and 251 as will be subsequently described in greater detail, the support members 165 and 166 are further bored transversely in two locations so that each will support two lower elongate rods, with FIGURE 13 showing the rod 170 being supported by the support 165, while the rod 171 is shown supported by the support member 166. If reference will be made to FIGURE 1, the upper rods 172 and 173 can be seen by referring to the arm mechanism 102, where the rod 172 is shown supported by the support member 165, while the rod 173 is supported by the support 166, with both of these rod members 172 and 173 being disposed in parallel with each other and in elevated relationship to the rod members 170 and 171 so that a total of four such rods are provided as clearly shown in FIGURE 24 of the drawings.

In addition to the aforementioned structural characteristics, each support member 165 and 166 is further formed to receive two additional components as follows.

First, and referring to FIGURE 14, it will be noted that each support includes a vertical guide rod 175 upon which the finish die 200 may reciprocate as previously indicated, with a spring loaded detent arrangement 400 (FIG. 37) also being provided on each support member 165 and 166 so as to permit the finish die 200 to be temporarily locked in place with respect to the support members, when any arm mechanism 100-104 is moved into and out of engagement with the blowing stations 70 and 80. In this regard, the finish die 200 will be raised and lowered by mechanical interlock with the rings 67c and 95c of pistons 67 and 95 (FIGURES 31 to 36) when any arm mechanism is at the forming station 60 and the ejection station 90 respectively.

3. THE FINISH DIE AND ACTUATING MECHANISM THEREFOR

In the preceding paragraphs the finish die has been generally designated by the numeral 200, although it has been indicated and should be understood that the same, in fact, includes several components that make up the subcombination generally designated by the numeral 200.

Further, and as will now be described, the finish die 200 per se, is shiftably carried by a support element 207 (FIGURE 37) that is, in turn, shiftably connected to a lifting plate 210 that will raise and lower the die 200 in tracks 167 and 168 (FIGURES 13 and 14).

Accordingly and referring to FIGURES 5, 13 and 14 for a detailed consideration of the finish die 200, it will be noted that the same includes complemental neck finishing dies 201 and 202 that are respectively secured to and move with carrier blocks 203 and 204 with these components being connected by bolts 205 and with the carrier blocks 203 and 204 being appropriately journaled for reciprocal mounting on shafts 206, 206 that are provided on support element 207 as shown in FIGURE 37. In this fashion, the dies 201 and 202 together with the associated components can separate and close as shown in FIGURES 13 and 14.

Referring now to FIGURES 5 through 7 of the drawings, the finish die assembly 200 further includes concentric telescoped sleeves 208 and 209, with sleeve 209 surrounding the lower portion of the blowing rod 230 and having its lower peripheral edge 209a positioned to define the inner wall of the bottle neck as clearly shown in FIGURE 5 of the drawings, for example. An integral ring member 209b is provided adjacent the upper end of sleeve 209 for the purpose of overlying the upper edge 208a of the sleeve 208 that concentrically surrounds the sleeve 209.

In this regard, the lower edge 208b of the sleeve 208 serves to form the top edge of the neck portion of the bottle while an enlarged ring portion 208c seats within the counterbore 207a of support element 207 so that the rings 208 and 209 will move upwardly upon upward movement of the support member 207.

The sleeve 208 further includes a shoulder 208d that engages the finish die components, while screw 207b serves to secure the sleeve 208 with respect to the support member 207. Rollers R1, R1 are provided on the carrier supports 203 and 204 for the purpose of being received in the tracks 167 and 168 as previously described.

Referring now to FIGURE 37 for a review of the support element 207, it will be noted that the same is of generally U-shaped configuration and is centrally apertured to accommodate the blowing rod 230 and the sleeves 208 and 209, with the carrier blocks 203 and 204 of the finish die being separable from each other as previously described.

Additionally, the support element 207 includes opposed bosses 207b, 207b that are appropriately bored for reception around the previously described support rods 175 that are provided on the mold supports 165 and 166 as described.

Again referring to FIGURE 37, the opposed faces 207c, 207c of the support element 207 are provided with vertical slots within which the opposed lower edges 210e, 210e of the lifting element 210 can slide with the upper limit of such relative sliding movement between the members 207 and 210 being determined by lug members 207d, 207d that are bolted in place over the top of the just described slots. Springs 211, 211 are operably interconnected between the lower edge of the lifting element 210 and the surface 207e of the support element 207, with these springs normally urging the members 207 and 210 into the separated condition shown in FIGURES 13 and 14 of the drawings. Additionally, the springs 211, 211 serve to urge the die members 201 and 202 into separated position when positioned at the ejection station, with this situation being schematically shown in FIGURE 36 of the drawings.

With reference now to further detailed construction of the lifting arm 210, it will be noted that the upper rear face 210a thereof is provided with a notch 210b within which the ring member 65c or 95c of either the piston 67 or 75 can be received with this attachment being shown illustrated in the schematic views of FIGURES 31 through 37. A slot 210c is also provided on the front face of the lifting element 210 so as to accommodate a trip rod 212 whose projecting edge will disengage the locking mechanism 235 that is carried by the cross arm 169, with this condition of disengagement being shown best in FIGURE 9 of the drawings.

Again referring to FIGURE 37 of the drawings, it will be further noted that the lower portion of the lifting element 210 is provided with projecting fingers 214, 214, with these fingers being provided for the dual purpose of (1) disengaging the blowing rod 230 at the appropriate time by engaging the lifting collar thereof during upward movement of the finish die 200 and (2) providing a support against premature shifting of the finish die 200 during the forming operation.

4. THE BLOWING ROD AND THE ACTUATING MECHANISM THEREFOR

The blowing rod 230 is best shown in detailed configuration in FIGURES 2, 4, 5, 6, 7, 8, 9, 10, 11, 12, 13 and 14 of the drawings, while the operational aspects thereof with regard to movement are best illustrated in connection with the schematic diagrams forming FIGURES 31 to 36 inclusive. In essence, the blowing rod structure 230 includes a blowing head 231 (FIGURE 5) an elongate main support rod 232, a lifting collar 233 (FIGURES 6 and 7) and a support block 234 that is provided on the upper end of rod 232 for engagement with locking mechanism 235 (FIGURES 8 and 9).

Further, and again referring to FIGURES 8 and 9, the tube 231 receives a source of air from conduit 236, with such air entering hollow rod 231 through coupling 236a and being directed downwardly for emission through blowing head 231. The blowing head 231 is best shown in FIGURES 5, 6 and 7 as including central bore 231a that has a series of radial passageways 231b, 231b that communicate respectively with flatted surfaces 231c, 231c, with these flatted surfaces 231c abutting against the shoulder 232a provided on the lower end of the rod 232. In this fashion, a circular cavity is defined so that air emitting through the passages 231b, 231b will be directed into the upwardly turned peripheral trough 231d so as to be directed upwardly along the outer surfaces of the tube 232, with such emitting air forming, in effect, a cylindrical air barrier that prevents adherence of the drawn plastic to the outside of the tube 232 during movement to the position of FIGURE 6, for example.

Additionally, the head 231 includes a central cavity 231b that is disposed in opposed relationship to the discharge opening 150 so as to divert plastic toward the periphery of the head 231 as shown in FIGURE 5 of the drawings.

Figure 34:
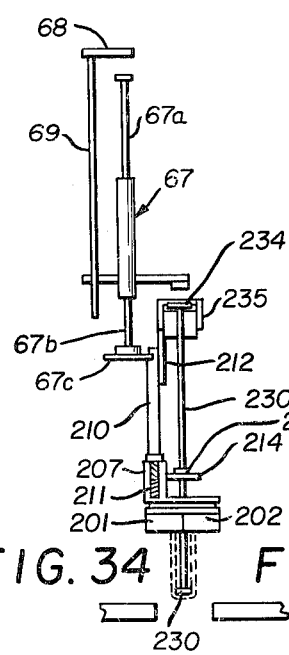
Figure 35:
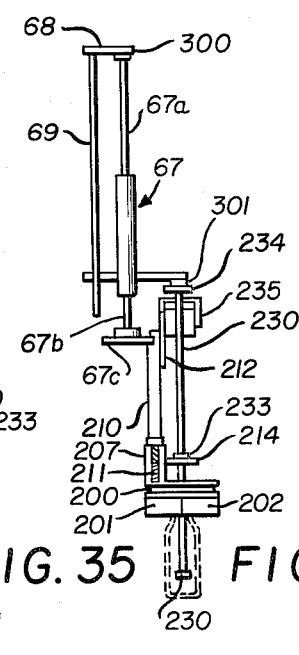

In addition to the aforementioned component parts, it has been indicated that the shaft 232 is surrounded by a lifting collar 234 with this collar 234 being secured to shaft 232 and being engaged by the fingers 214, 214 of finish die 200 during upward movement thereof, with such engagement and subsequent lifting being schematically shown in FIGURES 34 and 35.

One of the characteristic features of the invention herein being disclosed is that locking means 235 cause the blowing head 231 to remain in the down position of FIGURE 5 during the initial upward movement of the finish die 200, with this position of movement being shown between FIGURES 5 and 6, where the blowing rod 230 has remained in the down position while the finish head has moved upwardly to the position shown in FIGURE 6.

For the purpose of accomplishing such a hold down, reference is again made to FIGURES 8, 9 and 10 where the block 234 is shown provided with opposed shoulders 234a and 234b that are engaged by the hook elements 235a, 235a of the pivoted brackets 235b, 235b with these brackets each straddling the cross member 169 and being pivoted thereto, as at 237, 237 and with spring 238 normally urging the brackets toward the position of FIGURE 8. Additionally, the brackets 235b, 235b are pivoted to the disengaged condition of FIGURE 9 by engagement of the upper end trip member 212 with the notches 235c, 235c thereof, with this condition being clearly illustrated in FIGURES 8, 9 and 10 of the drawings.

5. THE MOLD HALVES

The mating mold halves are best shown in connection with FIGURES 1, 3, 4, 11, 12, 13, 22, 23, 24, 25 and 26 of the drawings, with the semi-schematic view of FIGURE 26 serving to best illustrate the movement of these mold halves.

Accordingly, and referring to FIGURE 26, the mold sections previously, generally referred to by the numeral 250, include mating mold halves 251 and 252 that slide on the guide rails 172 and 173 shown in FIGURE 26, as well as on the lower set of guide rails 170 and 171 (FIGURE 14). In this regard, and referring to FIGURE 26, these mold halves are in their separated position on arm 102, and are in closed position with respect to the arm mechanisms 103 and 104, where blowing to final shape in the closed mold halves is occurring. The molds have again separated in the ejection station occupied by the bottle forming mechanism 101 in FIGURE 26.

It should be understood that the mold sections of each arm mechanism are identical and are further mounted in similar fashion. Accordingly, a detailed description will be undertaken only with respect to the mold half 251 in FIGURE 22 of the drawings, with it being understood that the remaining mold halves are identical.

To this end, the mold 251 is shown provided with the usual design imparting cavity 251a for molding purposes, while the rear face thereof includes a T-slot 251b within which the T-head 252 of a bolt may be slidably received so as to effectuate locking of the mold 251 with respect to the main support casting 253. Each casting member 253 is provided with a central boss member 253a as well as four corner boss members 253b, 253c, 253d and 253e (see FIGURE 24). In this fashion, the just described corner boss members can be journaled about the rods 170, 171, 172 and 173 for sliding movement thereon as best shown in FIGURES 1 and 24 of the drawings, while the central boss 253a can be used for coaction with the mechanism locking the mold halves together.

For the purpose of effectuating such movement of the mold sections toward each other, reference is made to FIGURES 2 and 22, where it will be seen that the boss 253a is provided with an opening 253f that is covered by a cover plate 254, with the usual screws 254a, 254a serving to hold the cover plate securely in place on the boss 253a, and with the plate 254 being apertured to receive the shank 255a of a bolt 255, whose head portion 255b is received against the underside of the plate 254 as shown in FIGURE 22. A housing 256 has an end wall 257 that is apertured, as at 257a, to receive a reduced portion 255c of the shank 255, with the threaded end 255d of the bolt 255 being threadingly received in a follower block 258. A spring 255s normally urges housing 256 away from member 253 with appropriate interconnecting guideway being provided on these components for this purpose. Again referring to the follower block 258 (FIG. 2) the same has a through slot 258a that receives a slidable block 259 that has a roller 259a depending therefrom for engagement against the inner guide rail 106 as clearly shown in FIGURE 2 of the drawing. In this regard, the block 259 will move as a unit with member 256 by virtue of the attachment through bolts 261, 261 with adjustment of the position of the follower block being possible by virtue of threaded bolt 262.

In addition to the aforementioned component parts and referring to FIGURE 25, each box like support arm 160 has a guide unit 260 secured to the underside thereof, with the unit 260 slidably supporting the follower block 258. To this end, a bottom plate 261e spans the opposed arms 160b and 160c of support arm 160, and as shown in FIGURE 25, this bottom plate 260e includes guide rails 260f, 260f within which a dovetail guide way 260g may be positioned by use of bolts 260h. 260h. A complementally shaped dovetail 258e is provided on the block 258 for reciprocatory sliding movement in guideway 260g, while slide block 259 is slidably supported with respect to follower block 258 by clamping plates 259b, 259b that define a guideway for the same.

While the follower block 258 may slide longitudinally of the dovetail guide 260 and slide block 259 by virtue of the construction just described, it has further been found advantageous to provide a locking mechanism for the entire unit when the molds are in the closed position.

Accordingly, and referring to FIGURES 2, 21 and 24, it will be noted that a rocker arm 270 is pivoted with respect to each support casting 253, with the purpose of this rocker arm 270 being to effectuate a locking action of the mold with respect to the support slides therefor when the mold sections are tightly closed. Stated otherwise, the rocker arm 270 will come into operation after the mold halves 251a, 251a have closed together. Upon closure as just described, the opposed molds 253, 253 will be prevented from further closing movement. However, the slide block 259 and the follower block 258 will continue to move closer together and this subsequent closing movement will pivot the rocker arm to cause certain collet members to be tightened around the shaft and thus preclude accidental unlocking of the mold halves.

Accordingly and to this end and referring to FIGURE 2 where the rocker arm 270 is in unlocked position, the rocker arm 270 is shown pivoted, as at 271, to the support casting 253, with one rocker end 270a thereof, being positioned around a pin 272 of the link arm 273, while the remaining end of the rocker arm 270 is pivoted with respect to the slot 256d of housing 256 as shown in FIGURE 22 of the drawings.

Referring next to FIGURE 11 where the rocker arms are in their closed position, it will be noted that each rocker arm 270 has pivoted clockwise approximately 30 degrees, and that the pin 272 appearing at the left hand portion of the drawings has moved upwardly, while the piston 272 appearing in the right hand portion of the drawings has moved downwardly, so as to in each case, effectuate linear shifting of the link arms 273, 273. The net effect of the shifting of the link arms 273, 273 may be best observed from FIGURES 23 and 24, with FIGURE 24 indicating that the opposed ends of each link arm 273 are pivoted to collars 274 that surround and are integrally secured with respect to collapsing ring 275 (see FIGURE 23). The collapsing ring 275 has a tapered surface 275a that rides against complemental tapered surface 276a of a collet member 276. Additionally, the component parts 275 and 276 are threadingly connected, as at 277, with the result that rotation of the ring 275 relative of collet 276 will advance the ring 275 to the right of FIGURE 23 so as to collapse the collet tines into firm locking engagement with the shaft 171, as shown in FIGURE 23.

It should also be noted that FIGURE 23 includes appropriate overload springs 280 and sealing members 281, 281 for known purposes.

In summary, therefore, and with reference to the actuating and locking mechanism described above, the members 253 and 256 are normally spaced apart from each other by spring 255s as shown in FIGURE 22. However, after closure of the molds 251a, 251a continued inward movement of follower block 258 will result in shifting of the housing 256 relatively of member 253, to thus actuate the crank or rocker arm 270 and thus lock each mold member 253 with respect to each supporting shaft such as 171.

The only remaining component requiring description is with reference to the relief plungers 288, 288 that are provided in the housing 256 with springs 289, 289 backing up these plungers to prevent overload of the unit in known fashion.

OPERATION OF THE MOLDING MACHINE

A. *Introduction*

Before undertaking a description of the overall operation of the machine, it should be first noted that the machine shown and described in the preceding description simultaneously performs four distinct operations on four separate bottles at all times, with these operations being simultaneously preformed so that for each cycle that will herein be described, four complete bottles, will in fact, be ejected from the machine in finished form.

B. *Preparation and delivery of the plastic material to the forming apparatus*

Accordingly, and for the purpose of supplying the machine 50 with a constant source of properly plasticized plastic material, a source of such material is provided in the hopper 110 shown in FIGURE 1, with the hopper 110 serving to constantly supply material for the machine by causing the same to enter chamber 121 in the direction of the arrow shown in FIGURE 27. Material so entering the chamber 121 will be forced toward the left of FIGURE 27 by piston 122 and will be directed into one of the spiral chambers of the separator unit 125, whereupon the same will be progressively compacted and heated until the same emits through the opening 129e in a finely pulverized and perfectly homogeneous state.

Material emitting from the end of opening 129e will now enter the loading chamber 131a of storage turret 131 (FIGS. 19 and 20) and this condition of entry into the chamber 131a is shown best in FIGURE 21 of the drawings, where material is shown just engaging the right hand end of the discharge rod 136a. As additional material enters the chamber 131a from the discharge end 129e, the discharge rod 136a will be moved to the left of FIGURE 21 with the projecting end of rod 136a ultimately moving to the chain-dotted line position of FIGURE 21 whereupon the chamber 131a is completely filled. In this regard, it is to be understood that while the chamber 131a is being filled, the charge of material previously delivered to the chamber 131b is now in the storing position, while the material in the chamber 131c is being ejected from the storage turret 131 for ultimate transmission to the discharge opening 150 with FIGURE 2 showing the initial discharge of the material from the chamber 131c by virtue of discharge rod 136c being moved to the right of FIGURE 2 by piston 141. FIGURE 4 shows a further state of discharge wherein substantially all of the material in the chamber 131c has been ejected. Accordingly, while the cylinder 131c is being evacuated as discussed, the chamber 131a is simultaneously being filled with material that emits from the separator unit 120 and thus a constant source of material is always available.

Before undertaking the description of the operation of the discharge opening, reference will be made to the operation wherein the turret 131 is indexed to position a fresh charge for the subsequent operation. Accordingly and with reference to FIGURE 20 of the drawings, it will be noted that the turret 131 can be indexed 120 degrees by merely actuating the piston 135a so that the rack 133 thereof is extended to thus rotate the entire turret unit 120 degrees about the axis of cylinder 132 whereupon the charge that has been contained in the chamber 131b will be positioned in the position that is occupied by the chamber 131c in FIGURE 20 of the drawings, while the newly additional charge just described as entering the chamber 131a will move to the storage position that is occupied by the chamber 131b in FIGURE 20 of the drawings.

Turning now to FIGURES 16 and 17, the discharge passage 152 as shown in FIGURE 17, will be opened at the proper time by actuation of the piston 157 which will operate the gear 155 so as to reciprocate the piston 154 between the open and closed position, with the opening 154b of piston 154 moving into and out of registry with the opening 152 to either start or terminate the flow of plastic into the discharge opening 150 and with the opening 154b and 152 remaining in registry until the proper charge has been supplied from the discharge chamber 131c.

C. *The preshaping operation*

The sequence of operations that occur for each shaping operation can best be understood by first referring to FIGURES 5, 6 and 7 followed by reference to the schematic illustrations of FIGURES 31 through 36 inclusive.

Figure 31:
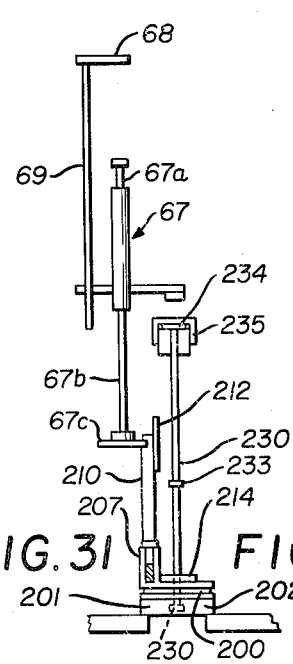

Accordingly and referring to FIGURE 5, it will first be noted that the finish die 200 is positioned in adjacency with the discharge opening 150 so that plastic entering the die 200 from opening 150 is injection molded in the neck area by the cavity defined by (1) the members 201 and 202 which form the outer thread design of the neck, (2) by the lower edge of the sleeve member 208 which forms a smooth uninterrupted lip edge and (3) by the external lower wall portion of the sleeve 209 which is being held in the down position by the projecting fingers 214, 214 of the lifting arm 210, with the lifting arm 210 being in adjacency with the finish die 200 as shown schematically in FIGURE 31 of the drawings.

It should further be noted that at this time, the blowing rod 230 is retained in the down position by virtue of the lugs 235a, 235a being secured over the arrow-shaped edge 234a of the locking head 234 as best shown in FIGURES 8 and 9 of the drawings. Accordingly, in the position of FIGURE 5, all component parts are locked against upward movement.

Figure 32:
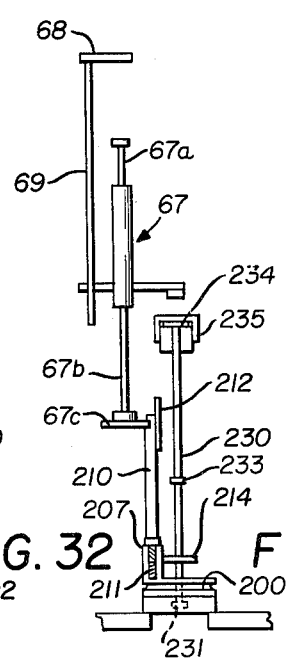
Figure 33:
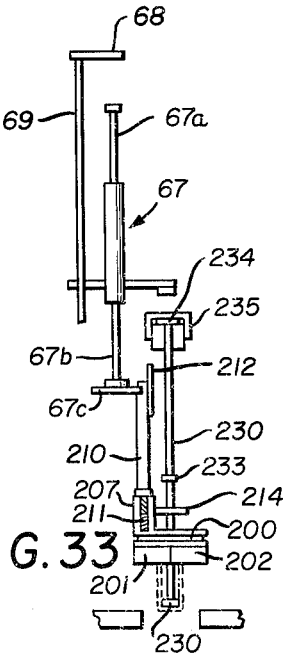

When the lifting rod 210 is moved upwardly, by operation of the piston 67 as shown schematically in FIGURE 32, the component parts of the finish die 200 will move toward the position of FIGURE 6 with the finish die and the component parts associated therewith, moving relatively of the blowing rod 230 whose locking head 234 is still engaged with locking means 235. Just prior to the time the lifting collar 233 of blowing rod assembly 230 is engaged by the fingers 214, 214 (FIGURE 34), the rod 212 will unlock the locking means 235 (FIGURES 9, 33) to release the blowing rod 230 for upward movement that will occur as fingers 214, 214 engage collar 233 and continue upward (FIGURE 24).

Before proceeding further, it should be noted that between the movement of FIGURES 5 and 6, there will first be a lifting movement of the lifting arm 210 prior to any movement of the finish die 200 with such relative movement between FIGURES 31 and 32 occurring by virtue of the springs 211, 211 urging separation between these component parts (FIGURES 13 and 14).

In the preferred embodiment of the invention, it has been indicated as preferably to unlock the head 234 of the blowing rod 230 prior to engagement between the fingers 211 and the collar 233 shown in FIGURE 34 of the drawings, and this unlocking is shown in FIGURE 9, where the upper end of rod 212 is shown separating the clamping arms 235b, 235b around their point of pivotal movement so as to unlock the head 234 to permit subsequent upward movement of the blowing rod 230. Thus, in the movement between the positions of FIGURES 6 and 7 as well as in the movement between the positions of FIGURES 34 and 35, the blowing rod 230 and the finish die mechanism 200 move in unison with the result that the plastic tube that has been extruded around the depressed blowing rod is moved free and clear of the discharge opening 150 which has been closed off at the appropriate time by piston 157 (FIGURE 17).

Appropriate stops 300 and 301 are indicated in FIGURES 34 and 35 for limiting upward travel of the blowing rod 230 and the lifting arm 210 to thus properly position the preshaped charge between the open mold sections as shown in FIGURE 7.

When the component parts have reached the position shown in FIGURE 7 and further shown schematically in FIGURE 34, the sequence of operation at the forming station 60 is completed, and at this time, and assuming that the operation just described, has been conducted with respect to the arm 102, the arm 102 may then be moved 90 degrees clockwise into registry with the first blowing station 70, with such movement causing the mold halves 151 and 152 to move together by virtue of the rollers 159a, 159a thereof being forced closer together by encountering the converging portions 105 and 106a of the outer and inner track respectively as shown in FIGURE 26 of the drawings.

D. *The blowing operations*

When the blowing station 70 is reached, it will be noted that the molded sections have been closed about the preshaped body and at this time and referring to FIGURES 7 and 11, air may be admitted into the interior of the cavity through the blowing tube 230 to cause the tubular column of plastic to be blown against the walls of the mold and thus form the bottle to the proper configuration.

The above sequence of operation is repeated when the arm bearing the bottle being described is moved to the second blowing station 80 and in this regard, either one or two blowing stations could be employed with the two blowing stations being herein described, to minimize the time lost by any single blowing station which normally exceeds the time for either injecting or ejecting the bottle being treated.

Accordingly and assuming that the second blowing operation has now been consummated at station 80, the arm bearing the bottle being described will once again be indexed an additional 90 degrees so as to move into the position shown in FIGURES 12, 14 and 36. In this regard, it will be noted that the lifting rod 95 associated with station 90 has been received in the groove 210a of the lifting arm 210, with it being noted that during the movement of the arm 102 from station 80 to station 90, the mold halves will once again be separated by virtue of encounter of rollers 159a, 159a with the now diverging inner and outer tracks as clearly shown in FIGURE 26 of the drawings.

E. *The ejection operation*

Accordingly and with the molds spaced apart as just described, the lifting arm 210 may be lowered by the piston rod 95 and this downward movement is schematically illustrated in FIGURE 36.

A significant feature of the invention has been previously indicated as being concerned with the shifting movement that exists between the lifting arm 210 and the finish die 200 and it is during final ejection as now being discussed that the value of the features becomes apparent.

In this regard, and specifically referring to FIGURES 13 and 14, it will be noted that when the arm 210 reaches the lower limit of its travel, as shown schematically in FIGURE 36, there will be nothing that will be opposing further downward movement of the finish die 200 under the influence of the springs 211, 211. Accordingly, and with these springs urging finish die downward, the members 201, 202 separated by virtue of the rollers R1, R1 will be entering the divergent portion 167a, 168a of tracks 167, 168 as shown in FIGURE 14.

Such separation has the effect of breaking the neck dies from the finished bottle and if reference is made to FIGURE 36, it will be noted that the force of the fingers of the lifting arm, acting on the support 207 will serve to strip the inner neck surface of the bottom from the lower outer surface of the sleeve 209 which has reached the limit of its downward travel upon engaging blowing head 231. Accordingly and at this time, the finished bottle will be adhered only to the lower edge of sleeve 208 and in the normal instance, it has been found that the bottle will normally fall off, although it is obvious that a blast of air could be used when the down position of FIGURE 14 has been reached.

After the ejection has been effectuated as just described, the piston 95 will lift the arm 210 and lock the member 207 in place with respect to supports 165 and 166 by engaging the detent means 400 that are operable therebetween as shown in FIGURES 31 to 37.

With reference to the detent means shown in FIGURE 37, the same merely operate to hold the neck ring in position with regard to the supports 165 and 166 in this regard, when the neck ring is in the forming station 60, the ring 65a will be engaged and hold the same against gravity, while similar hold against gravity is achieved by the ejection station 90 by use of the ring 95c which engages the slot 210b for this purpose.

At this time, the arm whose operation has just been described, may be returned to the forming station 60 for repetition of the above described cycle of events.

In connection with the foregoing description, no attempt has been made to describe in detail the electrical connections that are provided for sequenced operation of the equipment herein being discussed. It is to be understood, however, for example, that such sequenced operation is contemplated and that automatic indexing with the use of known types celluloids is contemplated as being within the scope of this invention. Thus and for example, the turret storage mechanism can be automatically indexed in timed coaction with the reciprocating piston 141 while movement from the forming to the first blowing station could be initiated upon contact of piston rod 67a with stop 300, with these and other automatic sequencing circuits not being considered a part of the invention herein being disclosed.

CONCLUSION

It will be seen from the foregoing that there has been provided a new and improved type of bottle making apparatus that constitutes several improvements over the prior art.

As a first improvement, it will be noted that the bottle forming mechanisms designed to obviate the need for any trimming operation of any type with the result that the problem of trimmed residue removal is not present, with the bottle herein being completely preshaped and closed before the closure of the mold section occurs.

It will be secondly noted that elimination of this problem of residue removal permits utilization of a turret like arrangement where bottles are progressively indexed from station to station so that the various requisite operations can be simultaneously preformed at one time on a plurality of bottles.

As a third advancement, it will be noted that improvement has been provided with reference to the manner in which the material is prepared and delivered to the forming mechanism for the initial shaping operation, with specific attention being directed to the problem of providing consistent uniform temperature conditions and with improvements along this line including the use of an indexable delivery turret that insures that each charge is uniform in consistency and the temperature, and with even further improvement in this regard being afforded by the use of the separator unit that improves the consistency of the material even prior to the delivery of the same to the storage turret above described.

While a full and complete description of the invention has been set forth in accordance with the dictates of the patent statutes, it is to be understood that the invention is not intended to be limited to the specific embodiment herein shown.

Accordingly, modifications of the invention may be resorted to without departing from the spirit hereof or the scope of the appended claims.

What is claimed is:

1. Forming means associated with an air source and adapted to form a flowable plastic charge received from a discharge opening into an inflatable hollow charge that may subsequently be blown into a container, comprising;
    (A) a finish neck die adapted to
        (1) receive the initial portion of said plastic charge emitting from said discharge opening and
        (2) mold the same into a neck portion of said container;
    (B) a blowing rod
        (1) telescoped within said neck die in axially shiftable relationship therewith
        (2) and having a blowing head that
            (a) overlies said discharge opening so as to direct material emitting from said discharge opening around its periphery into hollow form and
            (b) connects to said air source of said material delivery means to provide an air wall between said blowing rod and said emitting hollow material.

2. The device of claim 1 further characterized by the presence of lifting means
    (A) initially moving said neck die away from said discharge opening following molding of said neck portion while retaining said blowing rod in overlying relationship to said discharge opening;
    (B) subsequently moving said neck die and said blowing rod away from said discharge opening in unison whereby the final portion of said emitting hollow charge is formed around said blowing head while the central portion of said hollow charge is spaced from said blowing rod by said air wall.

3. A machine for blow molding plastic containers of the character described, comprising;
    (A) material delivery means including
        (1) means for plasticizing said material into flowable condition;
        (2) a rotatable indexable storage turret
            (a) having a plurality of storage chambers disposed in parallelism with the axis of rotation of said turret, and
            (b) being indexable between loading and unloading positions;
        (3) means for delivering said flowable plastic material to the particular storage chamber that is disposed in said loading position;
        (4) a forming station including
            (a) a discharge opening and
            (b) an air source;
        (5) means for ejecting a predetermined charge of flowable plastic from the particular chamber that is disposed in said unloading position and delivering the same through said discharge opening with said loading and ejecting occurring between each indexing of said turret;
    (B) and means for blowing said emitting charge into a predetermined container shape.

4. A machine for blow molding plastic containers of the character described, comprising;
    (A) material delivery means for delivering a premeasured charge of flowable plastic material to a discharge opening;
    (B) support means shiftable with respect to said material delivery means;
    (C) forming means shiftably carried by said support means and being shiftable into and out of overlying relationship with said discharge opening, with said forming means withdrawing a prepared charge from said discharge opening and forming the same into a hollow charge and including
        (1) a finish neck die adapted to
            (a) receive the initial portion of said plastic charge emitting from said discharge opening and
            (b) mold the same into a neck portion of said container;
        (2) a blowing rod
            (a) telescoped within said neck die in axially shiftable relationship therewith
            (b) and having a blowing head that
                (1) overlies said discharge opening so as to direct material emitting from said discharge opening around its periphery into hollow form and
                (2) connects to said air source of said material delivery means to provide an air wall between said blowing rod and said emitting hollow material;
        (3) lifting means
            (a) initially moving said neck die away from said discharge opening following molding of said neck portion while retaining said blowing rod in overlying relationship to said discharge opening;
            (b) subsequently moving said neck die and said blowing rod away from said discharge opening in unison whereby the final portion of said emitting hollow charge is formed around said blowing head while the central portion of said hollow charge is spaced from said blowing rod by said air wall;
    (D) and means for blowing said hollow formed charge into a predetermined container shape.

5. A machine for blow molding plastic containers of the character described, comprising;
    (A) material delivery means including
        (1) means for plasticizing said material into flowable condition;

(2) an indexable storage turret
  (a) having a plurality of storage chambers that are indexable between loading and unloading positions;
(3) means for delivering said flowable plastic material to the particular storage chamber that is disposed in said loading position;
(4) a forming station including
  (a) a discharge opening and
  (b) an air source;
(5) means for ejecting a predetermined charge of flowable plastic from the particular chamber that is disposed in said unloading position and delivering the same through said discharge opening;

(B) support means shiftable with respect to said material delivery means;

(C) forming means shiftably carried by said support means and being shiftable into and out of overlying relationship with said discharge opening and including
  (1) separable mold sections,
  (2) a finish neck die
    (a) reciprocal within said mold sections, and
    (b) adapted to receive an initial portion of said plastic charge emitting from said discharge opening and
    (c) molding said charge into a neck portion of said container, and
  (3) a blowing rod
    (a) telescoped with in and spaced from said neck die in axially shiftable relationship therewith
    (b) and having a blowing head that
      (1) overlies said discharge opening so as to direct material emitting from said discharge opening around its periphery into hollow form and
      (2) connects to said air source of said material delivery means to provide an air wall between said blowing rod and said hollow charge; and
  (4) lifting means
    (a) initially moving said neck die away from said discharge opening following molding of said neck portion while retaining said blowing rod in overlying relationship to said discharge opening, and
    (b) subsequently moving said neck die and said blowing rod away from said discharge opening in unison whereby the final portion of said hollow charge is formed around said blowing head while the central portion of the hollow charge is spaced from said blowing rod by said air wall;

(D) at least one blowing station fixed with respect to said material delivery means adapted to deliver pressurized fluid to said blowing rod for blowing said hollow charge to final configuration;

(E) said separable mold sections shiftably carried by said support means and being disposed around said forming means so as to envelope the same during the period said mold sections are closed;

(F) means for moving said support means and said forming means associated therewith into position with said blowing station while simultaneously
  (1) closing said mold sections around said hollow charge and
  (2) connecting said blowing rod to said source of pressurized fluid whereby said formed charge may be blown to final shape against the closed walls of said mold sections during the time the same are positioned adjacent said blowing station;

(G) an ejection station fixed with respect to said material delivery means and
  (1) having means to separate said neck die from said formed container when said support means are positioned at said ejection station;

(H) and means separating said mold sections from said formed container during movement of said support means from said blowing station to said ejection station.

6. The device of claim 5 further characterized by the fact that said hollow charge is drawn in tubular form.

7. The device of claim 5 further characterized by the presence of a final blowing station duplicating said first mentioned blowing station and being disposed between said first mentioned blowing station and said ejection station.

8. A machine for blow molding plastic containers of the character described, comprising;
(A) material delivery means including
  (1) means for plasticizing said material into flowable condition;
  (2) an indexable storage turret
    (a) having a plurality of storage chambers that are indexable between loading and unloading positions;
  (3) means for delivering said flowable plastic material to the particular storage chamber that is disposed in said loading position;
  (4) a forming station including
    (a) a discharge opening and
    (b) an air source;
  (5) means for ejecting a predetermined charge of flowable plastic from the particular chamber that is disposed in said unloading position and delivering the same through said discharge opening with said loading and ejecting occurring between each indexing of said turret;

(B) support means shiftable with respect to said material delivery means;

(C) forming means shiftably carried by said support means and being shiftable into and out of overlying relationship with said discharge opening and including
  (1) separable mold sections,
  (2) a finish neck die
    (a) reciprocal within said mold sections
    (b) adapted to receive an initial portion of said plastic charge emitting from said discharge opening and
    (c) molding said charge into a neck portion of said container, and
  (3) a blowing rod
    (a) telescoped within and spaced from said neck die in axially shiftable relationship therewith
    (b) and having a blowing head that
      (1) overlies said discharge opening so as to direct material emitting from said discharge opening around its periphery into hollow form and
      (2) connects to said air source of said material delivery means to provide an air wall between said blowing rod and said hollow charge, and
  (4) lifting means
    (a) initially moving said neck die away from said discharge opening following molding of said neck portion while retaining said blowing rod in overlying relationship to said discharge opening;
    (b) subsequently moving said neck die and said blowing rod away from said discharge opening in unison whereby the final portion of said emitting hollow charge is formed around said blowing head while the central portion of said hollow charge is spaced from said blowing rod by said air wall;

(D) and means for blowing said hollow charge into a predetermined container shape.

9. A blow molding device of the character described, comprising;
(A) a base;
(B) forming, blowing and ejection stations supported on said base in equally spaced relationship with each other;
(C) a support member shiftably carried by said base and having a number of forming units that correspond in number to the number of forming, blowing and ejection stations provided on said base and with said forming units being located so that all units engage all stations during each cycle of operation, whereby simultaneous forming, blowing, and ejecting operations can be conducted on said forming unit during each cycle of operation;
(D) and a discharge opening delivering a measured charge of material to the forming unit disposed adjacent the forming station during each cycle of operation and emitting charge being formed into hollow configuration during said emission;
(E) a multichamber rotatable storage turret that delivers a material charge from one of its chambers to said discharge opening during each cycle of operation;
(F) means to replenish another chamber of said storage turret with a fresh charge of flowable material of identical amount to that dispensed during each cycle with such replenishing occurring simultaneously with despensing during each cycle of operation.

10. In combination with separable container mold sections having a cylindrical interior configuration and a discharge opening that delivers a premeasured charge of material between said mold sections when the same are separated;
(A) forming means including
(1) a neck die receiving the initial portion of said charge of material delivered from said discharge opening and thereafter moving away from said opening;
(2) a blowing head telescoped within said neck die and said mold sections and overlying said discharge opening so as to direct material emitting from said discharge opening around its periphery into hollow form;
(B) blowing means
(1) inflating said charge against the walls of said mold sections upon closure of the same whereby said charge is formed into a final shaped container;
(C) and ejection means
(1) separating said shaped container from said mold sections during movement of said mold sections to separating position.

11. The device of claim 10 further characterized by the presence of means for forming the bottom wall of said container prior to closure of said mold sections.

References Cited by the Examiner
UNITED STATES PATENTS

| | | | |
|---|---|---|---|
| 2,235,324 | 3/41 | Moreland. | |
| 2,308,632 | 1/43 | Stenberg. | |
| 2,810,934 | 10/57 | Bailey | 264—98 |
| 2,928,120 | 3/60 | Leghorn et al. | 264—98 |
| 2,961,705 | 11/60 | Wacker | 18—30 |
| 3,001,239 | 9/61 | Santelli | 264—98 |
| 3,008,192 | 11/61 | Allen et al. | 264—97 |
| 3,029,468 | 4/62 | Valyi | 18—5 |
| 3,069,722 | 12/62 | Kato | 18—5 |
| 3,080,614 | 3/63 | Adams. | |
| 3,081,489 | 3/63 | Jackson et al. | 18—5 |
| 3,082,484 | 3/63 | Sherman. | |
| 3,127,637 | 4/64 | Rex | 18—30 |

J. SPENCER OVERHOLSER, *Primary Examiner.*

MORRIS LEIBMAN, ALEXANDER H. BRODMERKEL, MICHAEL V. BRINDISI, WILLIAM J. STEPHENSON, *Examiners.*